(12) United States Patent
Shin et al.

(10) Patent No.: US 12,520,588 B2
(45) Date of Patent: Jan. 6, 2026

(54) DISPLAY DEVICE

(71) Applicant: Samsung Display Co., LTD., Yongin-si (KR)

(72) Inventors: Dong Hee Shin, Asan-si (KR); No Kyung Park, Hwaseong-si (KR); Sun Kwun Son, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 529 days.

(21) Appl. No.: 18/104,478

(22) Filed: Feb. 1, 2023

(65) Prior Publication Data

US 2023/0326936 A1    Oct. 12, 2023

(30) Foreign Application Priority Data

Apr. 6, 2022    (KR) .................. 10-2022-0042977

(51) Int. Cl.
*H10D 86/40*    (2025.01)
*H01L 25/16*    (2023.01)

(52) U.S. Cl.
CPC ......... *H10D 86/481* (2025.01); *H01L 25/167* (2013.01); *H10D 86/441* (2025.01)

(58) Field of Classification Search
CPC ... H10D 86/481; H10D 86/441; H01L 25/167
See application file for complete search history.

(56) References Cited

U.S. PATENT DOCUMENTS

2023/0071859 A1*    3/2023    Park .................. H10D 30/6757

FOREIGN PATENT DOCUMENTS

KR    10-2018-0036818    4/2018

* cited by examiner

*Primary Examiner* — Peter M Albrecht
(74) *Attorney, Agent, or Firm* — Womble Bond Dickinson (US) LLP

(57) ABSTRACT

A display device includes a first voltage line disposed in a first metal layer on a substrate and extending in a first direction, a first transistor including a source electrode disposed in an active layer on the first metal layer and a gate electrode disposed in a second metal layer on the active layer, the first transistor being electrically connected to the first voltage line, a first connection electrode disposed in the second metal layer and integrally formed with the gate electrode of the first transistor, a cover pattern disposed in the second metal layer and spaced apart from the first connection electrode in the first direction, and a first capacitor including a first capacitor electrode disposed in the active layer and electrically connected to the gate electrode of the first transistor, and a second capacitor electrode disposed in the first metal layer and electrically connected to the source electrode of the first transistor. A first side of the cover pattern and a first side of the first connection electrode facing each other overlap the first capacitor electrode in a plan view.

20 Claims, 17 Drawing Sheets

DISPLAY DEVICE

CROSS-REFERENCE TO RELATED APPLICATION(S)

This application claims priority to and benefits of Korean Patent Application No. 10-2022-0042977 under 35 U.S.C. § 119, filed on Apr. 6, 2022, in the Korean Intellectual Property Office (KIPO), the entire contents of which are incorporated by reference herein in its entirety.

BACKGROUND

1. Technical Field

The disclosure relates to a display device.

2. Description of the Related Art

As the information society has developed, the demand for display devices for displaying images has diversified. For example, display devices have been applied to various electronic devices such as smart phones, digital cameras, notebook computers, navigation systems, and smart televisions. Examples of display devices include flat panel display devices such as a liquid crystal display (LCD) device, a field emission display (FED) device, or an organic light-emitting diode (OLED) display device. The OLED display device, in particular, includes light-emitting elements, which can allow pixels of a display panel to emit light, and can thus display an image without the aid of a backlight unit that provides light to the display panel. Here, the light-emitting elements may be OLEDs using an organic material as a fluorescent material and inorganic light-emitting diodes (LEDs) using an inorganic material as a fluorescent material.

SUMMARY

Aspects of the disclosure provide a display device capable of uniformly maintaining a capacitance of a first capacitor even when an error arises during the alignment of an active layer and a second metal layer.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment of the disclosure, a display device may include a first voltage line disposed in a first metal layer on a substrate and extending in a first direction, a first transistor including a source electrode disposed in an active layer on the first metal layer and a gate electrode disposed in a second metal layer on the active layer, the first transistor being electrically connected to the first voltage line, a first connection electrode disposed in the second metal layer and integrally formed with the gate electrode of the first transistor, a cover pattern disposed in the second metal layer and spaced apart from the first connection electrode in the first direction, and a first capacitor including a first capacitor electrode disposed in the active layer and electrically connected to the gate electrode of the first transistor, and a second capacitor electrode disposed in the first metal layer and electrically connected to the source electrode of the first transistor. A first side of the cover pattern and a first side of the first connection electrode facing each other may overlap the first capacitor electrode in a plan view.

A first width of the cover pattern and a second width of the first connection electrode in a second direction may be equal. The second direction may intersect the first direction.

A second side of the cover pattern adjacent to the first side of the cover pattern and a second side the first connection electrode adjacent to the first side of the first connection electrode may be colinear with each other.

The display device may further include a data line disposed in the first metal layer and extending in the first direction, and a second transistor including a source electrode and a drain electrode and electrically connecting the data line and the first capacitor electrode.

The source electrode of the second transistor and the first capacitor electrode may be integral with each other.

The display device may further include a second connection electrode disposed in the second metal layer and electrically connecting the data line and the drain electrode of the second transistor.

The display device may further include an initialization voltage line disposed in the first metal layer and extending in the first direction, and a third transistor including a source electrode and a drain electrode and electrically connecting the initialization voltage line and the source electrode of the first transistor.

The display device may further include a third connection electrode disposed in the second metal layer and electrically connecting the initialization voltage line and the source electrode of the third transistor.

The display device may further include a fourth connection electrode disposed in the second metal layer and electrically connecting the source electrode of the first transistor, the drain electrode of the third transistor, and the second capacitor electrode.

The display device may further include a fifth connection electrode disposed in the second metal layer, electrically connected to the second capacitor electrode, and integrally formed with the cover pattern.

The display device may further include a first electrode disposed in a third metal layer on the second metal layer, extending in the first direction, and electrically connected to the fifth connection electrode, and a second electrode disposed in the third metal layer and extending in parallel to the first electrode.

The display device may further include light-emitting elements arranged between the first electrode and the second electrode, a second voltage line disposed in the second metal layer and extending in a second direction intersecting the first direction, a first contact electrode disposed in a fourth metal layer on the third metal layer and electrically connecting the first electrode and the light-emitting elements, and a second contact electrode disposed in the fourth metal layer and electrically connecting the second voltage line and the light-emitting elements.

The cover pattern may be electrically floated.

The display device may further include a vertical gate line disposed in the first metal layer and extending in the first direction, a horizontal gate line disposed in the second metal layer and extending in a second direction intersecting the first direction, and an auxiliary gate line extending in the first direction from the horizontal gate line.

According to an embodiment of the disclosure, a display device may include a first metal layer disposed on a substrate, an active layer disposed on the first metal layer, a second metal layer disposed on the active layer, a first transistor including a source electrode disposed in the active layer and a gate electrode disposed in the second metal layer, a first connection electrode disposed in the second metal layer and integrally formed with the gate electrode of the first transistor, a cover pattern disposed in the second metal layer and spaced apart from the first connection electrode in a first direction, and a first capacitor including a first capacitor electrode disposed in the active layer and electrically connected to the gate electrode of the first transistor, and a second capacitor electrode disposed in the first metal layer and electrically connected to the source electrode of the first transistor. A first width of the cover pattern and a second width of the first connection electrode in a second direction may be equal. The second direction may intersect the first direction.

A first side of the cover pattern and a first side of the first connection electrode facing each other may overlap the first capacitor electrode in a plan view.

A second side of the cover pattern adjacent to the first side of the cover pattern and a second side of the first connection electrode adjacent to the first side of the first connection electrode may be colinear with each other.

The display device may further include a data line disposed in the first metal layer and extending in the first direction, and a second transistor electrically connecting the data line and the first capacitor electrode.

The display device may further include an initialization voltage line disposed in the first metal layer and extending in the first direction, and a third transistor electrically connecting the initialization voltage line and the source electrode of the first transistor.

The display device may further include a first electrode disposed in a third metal layer on the second metal layer and extending in the first direction, a second electrode disposed in the third metal layer and extending in parallel to the first electrode, and a plurality of light-emitting elements arranged in the first direction between the first electrode and the second electrode.

In accordance with embodiments of the display device, as a cover pattern, which is disposed in a second metal layer on an active layer, distanced apart from a connection electrode and has a same width as the connection electrode, is provided, the capacitance of a first capacitor may be uniformly maintained even when error occurs during the alignment of the active layer and the second metal layer.

It should be noted that the effects of the disclosure are not limited to those described above, and other effects of the disclosure will be apparent from the following description.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
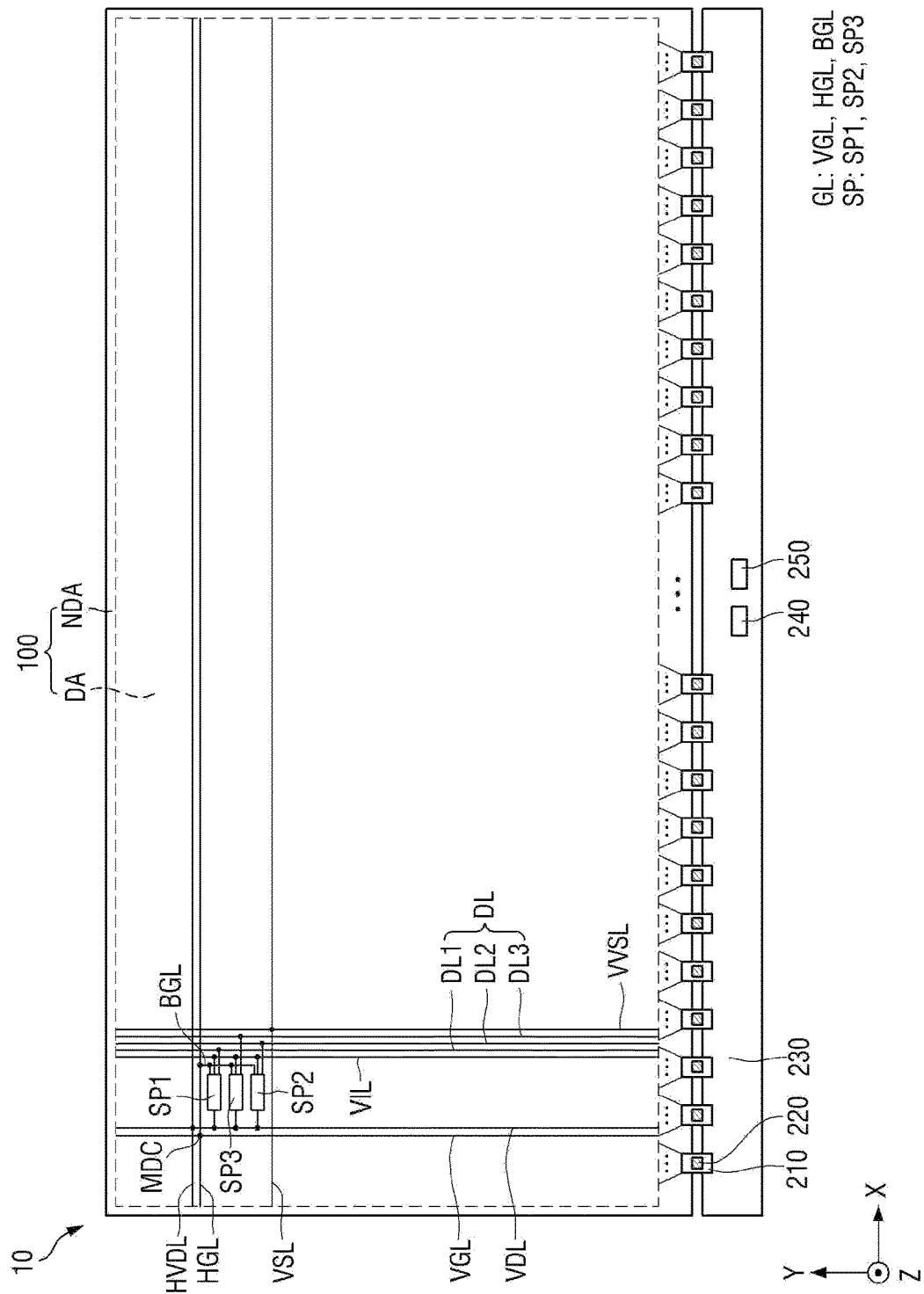
FIG. 1 is a plan view of a display device according to an embodiment of the disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

Unless specified otherwise, the terms "above", "top", and "top surface", as used herein, refer to an upward direction from the display device 10, i.e., a Z-axis direction, and the terms "below", "bottom", and "bottom surface", as used herein, refer to a downward direction from the display device 10, i.e., the opposite direction of the Z-axis direction. Also, unless specified otherwise, the terms "left", "right", "upper", and "lower", as used herein, refer to their respective directions as viewed from above the display device 10. For example, the terms "left", "right", "upper", and "lower" refer to the opposite direction of an X-axis direction, the X-axis direction, a Y-axis direction, and the opposite direction of the Y-axis direction, respectively.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation, not as terms of degree, and thus are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by one of ordinary skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or overly formal sense, unless clearly so defined herein.

Hereinafter, detailed embodiments of the disclosure will be described with reference to the accompanying drawings.

FIG. 1 is a plan view of a display device according to an embodiment of the disclosure.

Referring to FIG. 1, a display device 10, which is a device for displaying a moving or still image, may be used not only as the display screen of a portable electronic device such as a mobile phone, a smartphone, a tablet personal computer (PC), a smartwatch, a watchphone, a mobile communication terminal, an electronic notepad, an electronic book (e-book), a portable multimedia player (PMP), a navigation device, or a ultra-mobile PC (UMPC), but also as the display screen of various other products such as a television (TV), a laptop computer, a monitor, a billboard, or an Internet-of-Things (IoT) device.

The display device 10 may include a display panel 100, flexible films 210, display drivers 220, a circuit board 230, a timing controller 240, and a power supply part 250.

The display panel 100 may have a rectangular shape in a plan view. For example, the display panel 100 may have a rectangular shape having long sides in a first direction (or the X-axis direction) and short sides in a second direction (or the Y-axis direction), in a plan view. The corners where the long sides and the short sides of the display panel 100 meet may be right-angled or may be rounded to have a curvature. The planar shape of the display panel 100 is not particularly limited, and the display panel 100 may have various other shapes such as a non-tetragonal polygonal shape, a circular shape, or an elliptical shape. For example, the display panel 100 may be formed to be flat, but the disclosure is not limited thereto. In another embodiment, the display panel 100 may be formed to be bent to have a curvature.

The display panel 100 may include a display area DA and a non-display area NDA.

The display area DA, which is an area that displays an image, may be defined as a middle area of the display panel 100. The display area DA may include pixels SP, gate lines GL, data lines DL, initialization voltage lines VIL, first voltage lines VDL, horizontal voltage lines HVDL, vertical voltage lines VVSL, and second voltage lines VSL. The pixels SP may be formed in pixel regions at the intersections between the data lines DL and the gate lines GL. The pixels SP may include first pixels SP1, second pixels SP2, and third pixels SP3. Each of the first pixels SP1, the second pixels SP2, and the third pixels SP3 may be connected to one gate line GL and one data line DL. The first pixels SP1, the second pixels SP2, and the third pixels SP3 may be defined as minimal areas for outputting light.

The first pixels SP1 may emit first-color light or red light, the second pixels SP2 may emit second-color light or green light, and the third pixels SP3 may emit third-color light or blue light. The pixel circuits of the first pixels SP1, the pixel circuits of the third pixels SP3, and the pixel circuits of the second pixels SP2 may be arranged along the opposite direction of the second direction (or the Y-axis direction), but the disclosure is not limited thereto.

The gate lines GL may include vertical gate lines VGL, horizontal gate lines HGL, and auxiliary gate lines BGL.

The vertical gate lines VGL may be connected to the display drivers 220, may extend in the second direction (or the Y-axis direction), and may be spaced apart from one another in the first direction (or the X-axis direction). The vertical gate lines VGL may be arranged in parallel to the data lines DL. The horizontal gate lines HGL may extend in the first direction (or the X-axis direction) and may be spaced apart from one another in the second direction (or the Y-axis direction). The horizontal gate lines HGL may intersect the vertical gate lines VGL. For example, the horizontal gate lines HGL may be connected to the vertical gate lines VGL through contacts MDC. The contacts MDC may be parts of the horizontal gate lines HGL that are inserted in contact holes to be in contact with the vertical gate lines VGL. The auxiliary gate lines BGL may extend from the horizontal gate lines HGL to provide gate signals to the first pixels SP1, the second pixels SP2, and the third pixels SP3.

The data lines DL may extend in the second direction (or the Y-axis direction) and may be spaced apart from one another in the first direction (or the X-axis direction). The data lines DL may include first data lines DL1, second data lines DL2, and third data lines DL3. The first data lines DL1, the second data lines DL2, and the third data lines DL3 may provide data voltages to the first pixels SP1, the second pixels SP2, and the third pixels SP3, respectively.

The initialization voltage lines VIL may extend in the second direction (or the Y-axis direction) and may be spaced apart from one another in the first direction (or the X-axis direction). The initialization voltage lines VIL may supply initialization voltages from the display drivers 220 to the pixel circuits of the first pixels SP1, the pixel circuits of the second pixels SP2, and the pixel circuits of the third pixels SP3. The initialization voltage lines VIL may receive sensing signals from the pixel circuits of the first pixels SP1, the pixel circuits of the second pixels SP2, and the pixel circuits of the third pixels SP3 and may provide the sensing signals to the display drivers 220.

The first voltage lines VDL may extend in the second direction (or the Y-axis direction) and may be spaced apart from one another in the first direction (or the X-axis direction). The first voltage lines VDL may provide driving voltages or high-potential voltages from the power supply part 250 to the first pixels SP1, the second pixels SP2, and the third pixels SP3.

The horizontal voltage lines HVDL may extend in the first direction (or the X-axis direction) and may be spaced apart from one another in the second direction (or the Y-axis direction). The horizontal voltage lines HVDL may be connected to the first voltage lines VDL. The horizontal voltage lines HVDL may receive the driving voltages or the high-potential voltages from the first voltage lines VDL.

The vertical voltage lines VVSL may extend in the second direction (or the Y-axis direction) and may be spaced apart from one another in the first direction (or the X-axis direction). The vertical voltage lines VVSL may be connected to the second voltage lines VSL. The vertical voltage lines VVSL may provide low-potential voltages from the power supply part 250 to the second voltage lines VSL.

The second voltage lines VSL may extend in the first direction (or the X-axis direction) and may be spaced apart from one another in the second direction (or the Y-axis direction). The second voltage lines VSL may provide the low-potential voltages to the first pixels SP1, the second pixels SP2, and the third pixels SP3.

Depending on the number and the layout of the pixels SP, it may vary how the pixels SP, the gate lines GL, the data lines DL, the initialization voltage lines VIL, the first voltage lines VDL, and the second voltage lines VSL are connected to one another.

The non-display area NDA may be defined as an area of the display panel 100 other than the display area DA. For example, the non-display area NDA may include fan-out lines, which connect the vertical gate lines VGL, the data lines DL, the initialization voltage lines VIL, the first voltage lines VDL, and the vertical voltage lines VVSL to the display drivers 220, and pad units, which are connected to the flexible films 210.

Input terminals provided at first sides of the flexible films 210 may be attached to the circuit board 230 by a film attachment process, and output terminals provided at second sides of the flexible films 210 may be attached to the pad units by a film attachment process. For example, the flexible films 210, like tape carrier packages or chip-on-films, may be bent. The flexible films 210 may be bent toward the bottom of the display panel 100 to reduce the bezel area of the display device 10.

The display drivers 220 may be mounted on the flexible films 210. For example, the display drivers 220 may be implemented as integrated circuits (ICs). The display drivers 220 may receive digital video data and data control signals from the timing controller 240 and may convert the digital video data into analog data voltages and provide the analog data voltages to the data lines DL through the fan-out lines in accordance with the data control signals. The display drivers 220 may generate gate signals in accordance with gate control signals from the timing controller 240 and may sequentially provide the gate signals to the vertical gate lines VGL in a predefined order. Thus, the display drivers 220 may perform the functions of a data driver and a gate driver at the same time. As the display device 10 includes the display drivers 220, which are disposed in a lower part of the non-display area NDA, the size of left, right, and upper parts of the non-display area NDA can be minimized.

The circuit board 230 may support the timing controller 240 and the power supply part 250 and may provide signals and power to the display drivers 220. For example, the circuit board 230 may provide signals from the timing controller 240 and power supply voltages from the power supply part 250 to the display drivers 220 to display an image. To this end, signal lines and power lines may be provided on the circuit board 230.

The timing controller 240 may be mounted on the circuit board 230 and may receive image data and timing synchronization signals from a display driving system or a graphics device through a user connector on the circuit board 230. The timing controller 240 may generate digital video data by aligning the image data in accordance with the timing synchronization signals to fit the layout of the pixels SP, and may provide the digital video data to the display drivers 220. The timing controller 240 may generate data control signals and gate control signals based on the timing synchronization signals. The timing controller 240 may control the timing of providing data voltages from the display drivers 220, based on the data control signals and may control the timing of providing gate signals from the display drivers 220, based on the gate control signals.

The power supply part 250 may be disposed on the circuit board 230 and may provide power supply voltages to the display drivers 220 and the display panel 100. For example, the power supply part 250 may generate driving voltages or high-potential voltages and provide the high-potential voltages to the first voltage lines VDL, may generate low-potential voltages and provide the low-potential voltages to the vertical voltage lines VVSL, and may generate initialization voltages and provide the initialization voltages to the initialization voltage lines VIL.

Figure 2:
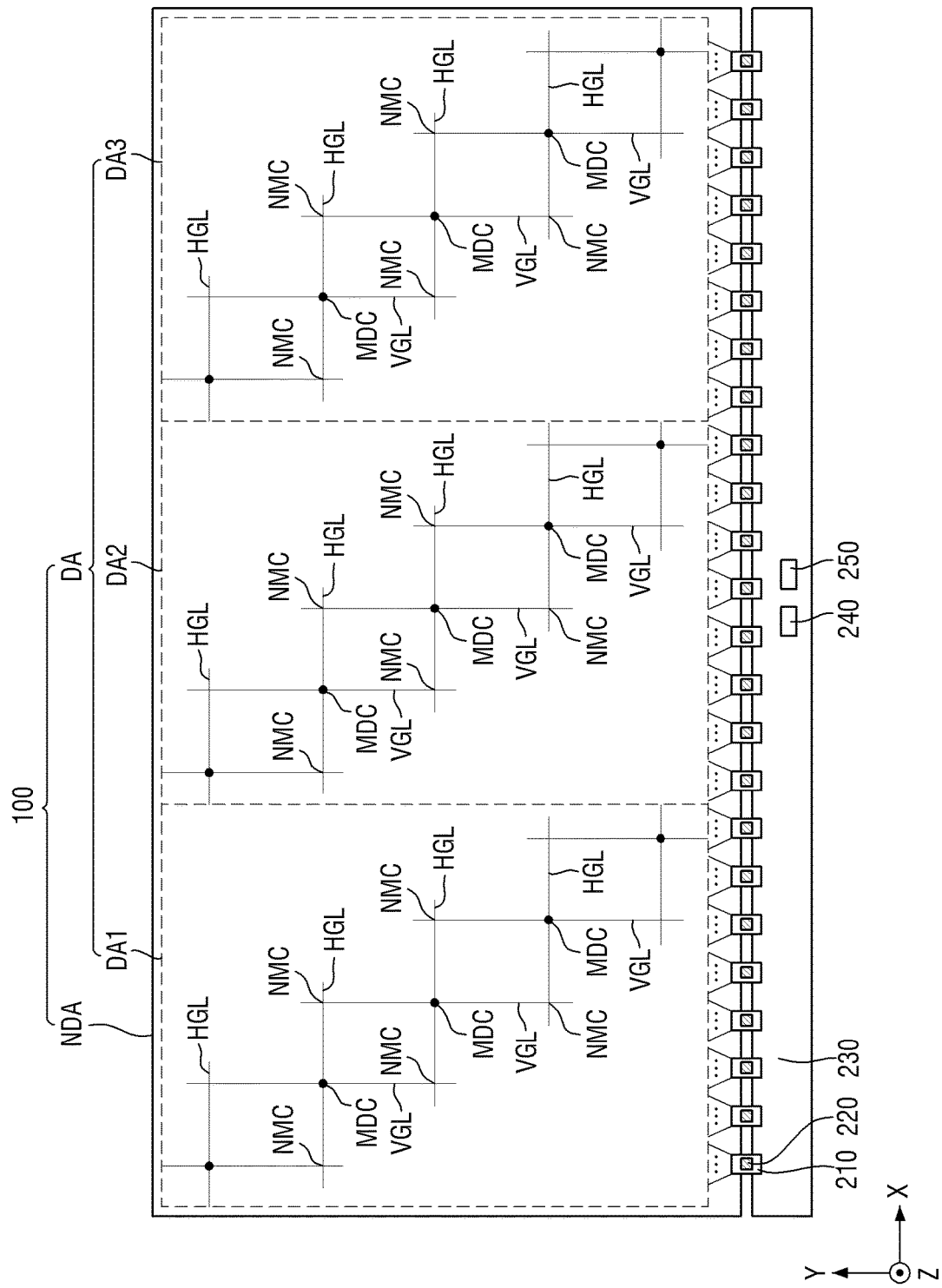
FIG. 2 is a plan view illustrating the contacts of vertical gate lines and horizontal gate lines of the display device of FIG. 1.

FIG. 2 is a plan view illustrating the contacts of the vertical gate lines and the horizontal gate lines of the display device of FIG. 1.

Referring to FIG. 2, the display area DA may include first, second, and third display areas DA1, DA2, and DA3.

The vertical gate lines HGL may intersect the vertical gate lines VGL. The horizontal gate lines HGL may intersect the vertical gate lines VGL, at the contacts MDC and non-contacts NMC. For example, each of the horizontal gate lines HGL may be connected to one of the vertical gate lines VGL through one of the contacts MDC and may be insulated from the rest of the vertical gate lines VGL at non-contacts NMC.

Contacts MDC in the first display area DA1 may be disposed along an extension line from an upper left part of the first display area DA1 to a lower right part of the first display area DA1. Contacts MDC in the second display area DA2 may be disposed along an extension line from an upper left part of the second display area DA2 to a lower right part of the second display area DA2. Contacts MDC in the third display area DA3 may be disposed along an extension line from an upper left part of the third display area DA3 to a lower right part of the third display area DA3. Accordingly, the contacts MDC may be arranged along a diagonal line between the first direction (or the X-axis direction) and the opposite direction of the second direction (or the Y-axis direction), in each of the first, second, and third display areas DA1, DA2, and DA3.

The display device 10 may include the display drivers 220, which perform the functions of a data driver and a gate driver. Thus, as the data lines DL and the vertical gate lines VGL receive data voltages and gate signals, respectively, from the display drivers 220, which are disposed in the lower part of the non-display area NDA, the size of the left, right, and upper parts of the non-display area NDA can be minimized.

Figure 3:
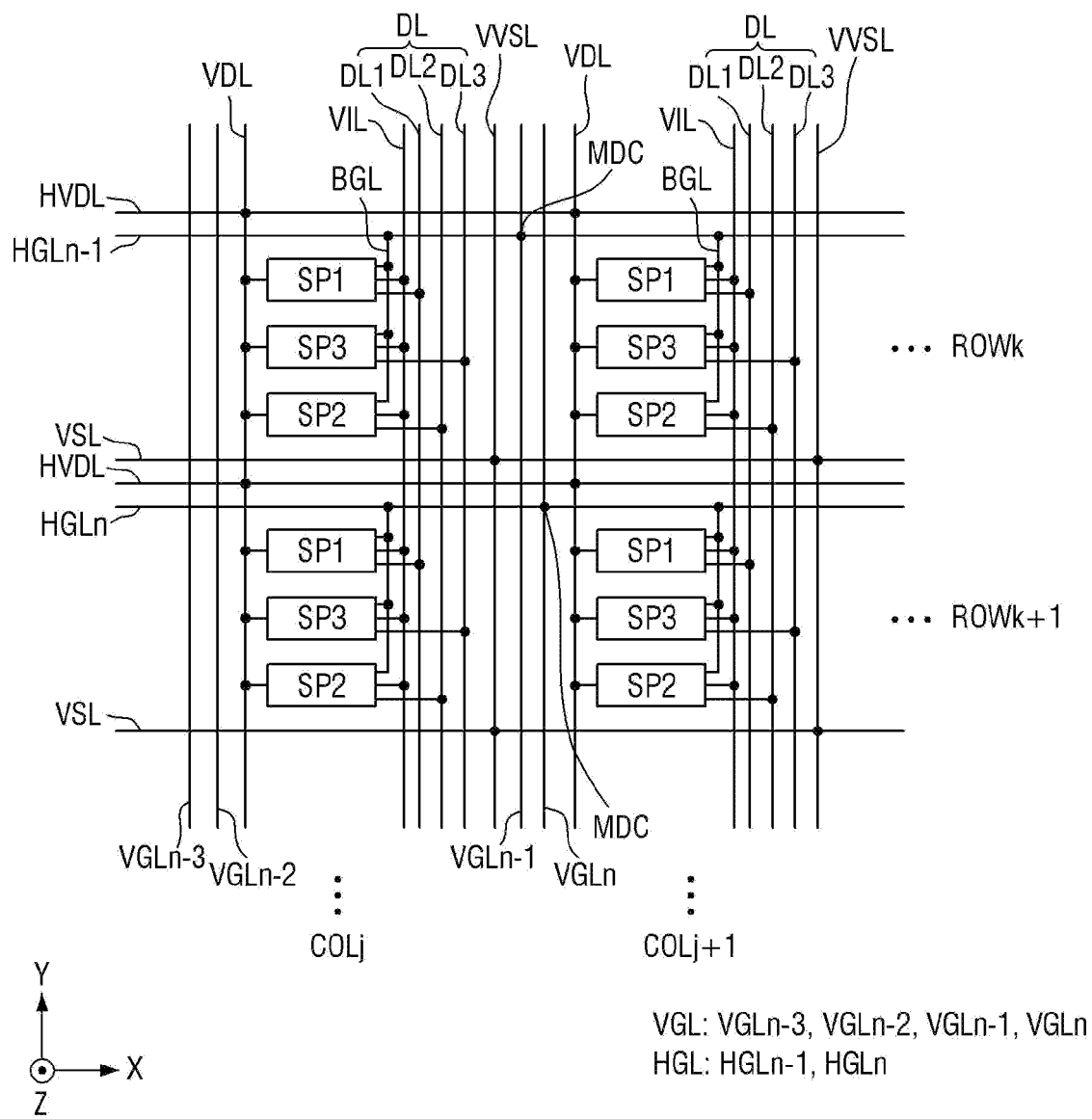
FIG. 3 illustrates pixels and lines of the display device of FIG. 1.

FIG. 3 illustrates the pixels and lines of the display device of FIG. 1.

Referring to FIG. 3, the pixels SP may include the first pixels SP1, the second pixels SP2, and the third pixels SP3. The pixel circuits of the first pixels SP1, the pixel circuits of the third pixels SP3, and the pixel circuits of the second pixels SP2 may be arranged along the opposite direction of the second direction (or the Y-axis direction), but the disclosure is not limited thereto.

The first pixels SP1, the second pixels SP2, and the third pixels SP3 may be connected to the first voltage lines VDL, the initialization voltage lines VIL, and the data lines DL.

The first voltage lines VDL may extend in the second direction (or the Y-axis direction). The first voltage lines VDL may be disposed on the left sides of the first pixels SP1, the second pixels SP2, and the third pixels SP3. The first voltage lines VDL may provide driving voltages or high-potential voltages to transistors of each of the first pixels SP1, the second pixels SP2, and the third pixels SP3.

The horizontal voltage lines HVDL may extend in the first direction (or the X-axis direction). The horizontal voltage lines HVDL may be disposed on the upper sides of the horizontal gate lines HGL. The horizontal voltage lines HVDL may be connected to the first voltage lines VDL. The horizontal voltage lines HVDL may receive the driving voltages or the high-potential voltages from the first voltage lines VDL.

The initialization voltage lines VIL may extend in the second direction (or the Y-axis direction). The initialization voltage lines VIL may be disposed on the right sides of the auxiliary gate lines BGL. The initialization voltage lines VIL may be disposed between the auxiliary gate lines BGL and the data lines DL. The initialization voltage lines VIL may provide initialization voltages to the pixel circuits of the first pixels SP1, the pixel circuits of the second pixels SP2, and the pixel circuits of the third pixels SP3. The initialization voltage lines VIL may receive sensing signals from the pixel circuits of the first pixels SP1, the pixel circuits of the second pixels SP2, and the pixel circuits of the third pixels SP3 and provide the sensing signals to the display drivers 220.

The gate lines GL may include the vertical gate lines VGL, the horizontal gate lines HGL, and the auxiliary gate lines BGL.

The vertical gate lines VGL may extend in the second direction (or the Y-axis direction). The vertical gate lines VGL may be connected between the display drivers 220 and the horizontal gate lines HGL. The vertical gate lines VGL may intersect the horizontal gate lines HGL. The vertical gate lines VGL may provide the gate signals from the display drivers 220 to the horizontal gate lines HGL.

For example, an (n−3)-th vertical gate line VGLn−3 (where n is a positive integer) and an (n−2)-th vertical gate line VGLn−2 may be disposed on the left side of a j-th column COLj (where j is a positive integer) of pixels SP. The vertical gate lines VGLn−3 and VGLn−2 may be disposed in parallel on the left sides of the first voltage lines VDL. An (n−1)-th vertical gate line VGLn−1 and an n-th vertical gate line VGLn may be disposed between a data line DL connected to the j-th column COLj of pixels SP and a first voltage line VDL connected to a (j+1)-th column COLj+1 of pixels SP. The (n−1)-th vertical gate line VGLn−1 may be connected to an (n−1)-th horizontal gate line HGLn−1 through a contact MDC and may be insulated from other horizontal gate lines HGL. The n-th vertical gate line VGLn may be connected to an n-th horizontal gate line HGLn through a contact MDC and may be insulated from other horizontal gate lines HGL. The (n−1)-th and n-th vertical gate lines VGLn−1 and VGLn may be disposed on the left side of the first voltage line VDL connected to the (j+1)-th column COLj+1 of pixels SP.

The horizontal gate lines HGL may extend in the first direction (or the X-axis direction). The horizontal gate lines HGL may be disposed on the upper sides of the first pixels SP1. The horizontal gate lines HGL may be connected between the vertical gate lines VGL and the auxiliary gate lines BGL. The horizontal gate lines BGL may provide the gate signals from the vertical gate lines VGL to the auxiliary gate lines BGL.

For example, the (n−1)-th horizontal gate line HGLn−1 may be disposed on the upper side of a k-th row ROWk (where k is a positive integer) of first pixels SP1. The (n−1)-th horizontal gate line HGLn−1 may be connected to the (n−1)-th vertical gate line VGLn−1 through a contact MDC and may be insulated from other vertical gate lines VGL. The n-th horizontal gate line HGLn may be disposed on the upper side of a (k+1)-th row ROWk+1 of first pixels SP1. The n-th horizontal gate line HGLn may be connected to the n-th vertical gate line VGLn through a contact MDC and may be insulated from other vertical gate lines VGL.

The auxiliary gate lines BGL may extend in the opposite direction of the second direction (or the Y-axis direction) from the horizontal gate lines HGL. The auxiliary gate lines BGL may be disposed on the right sides of the first pixels SP1, the second pixels SP2, and the third pixels SP3. The auxiliary gate lines BGL may provide gate signals from the horizontal gate lines HGL to the pixel circuits of the first pixels SP1, the pixel circuits of the second pixels SP2, and the pixel circuits of the third pixels SP3.

The data lines DL may extend in the second direction (or the Y-axis direction). The data lines DL may provide data voltages to the pixels SP. The data lines DL may include first data lines DL1, second data lines DL2, and third data lines DL3.

The first data lines DL1 may extend in the second direction (or the Y-axis direction). The first data lines DL1 may be disposed on the right sides of the initialization voltage lines VIL. The first data lines DL1 may provide the data voltages from the display drivers 220 to the pixel circuits of the first pixels SP1.

The second data lines DL2 may extend in the second direction (or the Y-axis direction). The second data lines DL2 may be disposed on the right sides of the initialization voltage lines VIL. The second data lines DL2 may provide the data voltages from the display drivers 220 to the pixel circuits of the second pixels SP2.

The third data lines DL3 may extend in the second direction (or the Y-axis direction). The third data lines DL3 may be disposed on the right sides of the initialization voltage lines VIL. The third data lines DL3 may provide the data voltages from the display drivers 220 to the pixel circuits of the third pixels SP3.

The vertical voltage lines VVSL may extend in the second direction (or the Y-axis direction). The vertical voltage lines VVSL may be disposed on the right sides of the third data lines DL3. The vertical voltage lines VVSL may be connected between the power supply part 250 and the second voltage lines VSL. The vertical voltage lines VVSL may provide low-potential voltages from the power supply part 250 to the second voltage lines VSL.

The second voltage lines VSL may extend in the first direction (or the X-axis direction). The second voltage lines VSL may be disposed on the lower sides of the second pixels SP2. The second voltage lines VSL may provide the low-potential voltages from the vertical voltage lines VVSL to light-emitting element layers of the first pixels SP1, light-emitting element layers of the second pixels SP2, and light-emitting element layers of the third pixels SP3.

Figure 4:
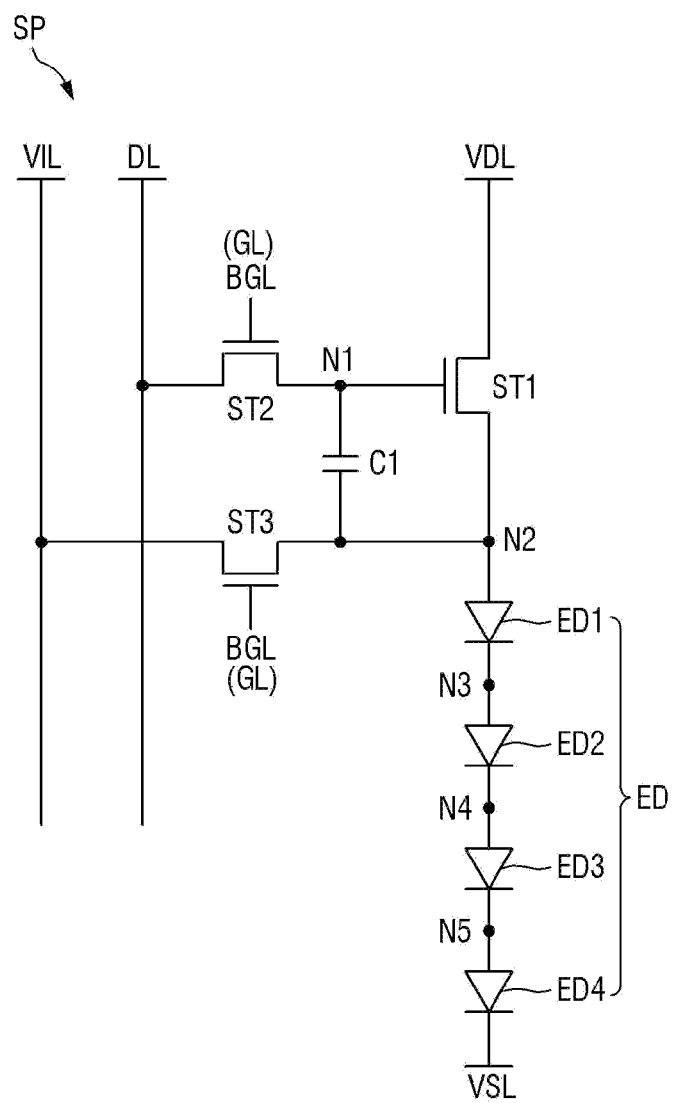
FIG. 4 is a schematic diagram of an equivalent circuit of a pixel of the display device of FIG. 1.

FIG. 4 is a schematic diagram of and equivalent circuit of a pixel of the display device of FIG. 1.

Referring to FIG. 4, a pixel SP may be connected to a first voltage line VDL, a data line DL, an initialization voltage line VIL, a gate line GL, and a second voltage line VSL.

The pixel SP may include first, second, and third transistors ST1, ST2, and ST3, a first capacitor C1, and multiple light-emitting elements ED.

The first transistor ST1 may include a gate electrode, a drain electrode, and a source electrode. The gate electrode of the first transistor ST1 may be connected to a first node N1, the drain electrode of the first transistor ST1 may be connected to the first voltage line VDL, and the source electrode of the first transistor ST1 may be connected to a second node N2. The first transistor ST1 may control a drain-source current (or a driving current) based on a data voltage applied to its gate electrode.

The light-emitting elements ED may include first, second, third, and fourth light-emitting elements ED1, ED2, ED3, and ED4. The first, second, third, and fourth light-emitting elements ED1, ED2, ED3, and ED4 may be connected in series. The first, second, third, and fourth light-emitting elements ED1, ED2, ED3, and ED4 may receive the driving current and may emit light. The amount of light emitted by the light-emitting elements ED or the luminance of the light-emitting elements ED may be proportional to the magnitude of the diving current. The light-emitting elements ED may be inorganic light-emitting elements including an inorganic semiconductor, but the disclosure is not limited thereto.

A first electrode of the first light-emitting element ED1 may be connected to the second node N2, and a second electrode of the first light-emitting element ED1 may be connected to a third node N3. The first electrode of the first light-emitting element ED1 may be connected to the source electrode of the first transistor ST1, a drain electrode of the third transistor ST3, and a second capacitor electrode of the first capacitor C1 through the second node N2. The second electrode of the first light-emitting element ED1 may be connected to a first electrode of the second light-emitting element ED2 through the third node N3.

The first electrode of the second light-emitting element ED2 may be connected to the third node N3, and a second electrode of the second light-emitting element ED2 may be connected to a fourth node N4. A first electrode of the third light-emitting element ED3 may be connected to the fourth node N4, and a second electrode of the third light-emitting element ED3 may be connected to a fifth node N5. A first electrode of the fourth light-emitting element ED4 may be connected to the fifth node N5, and a second electrode of the fourth light-emitting element ED4 may be connected to the second voltage line VSL.

The second transistor ST2 may be turned on by a gate signal from the gate line GL to electrically connect the data line DL and the first node N1, which is connected to the gate electrode of the first transistor ST1. The second transistor ST2 may be turned on by the gate signal from the gate line GL to provide a data voltage to the first node N1. A gate electrode of the second transistor ST2 may be connected to the gate line GL, a drain electrode of the second transistor ST2 may be connected to the data line DL, and a source electrode of the second transistor ST2 may be connected to the first node N1. The source electrode of the second transistor ST2 may be connected to the gate electrode of the first transistor ST1 and a first capacitor electrode of the first capacitor C1 through the first node N1.

The third transistor ST3 may be turned on by the gate signal from the gate line GL to electrically connect the initialization voltage line VIL and the second node N2, which is connected to the source electrode of the first transistor ST1. The third transistor ST3 may be turned on by the gate signal from the gate line GL to provide an initialization voltage to the second node N2. The third transistor ST3 may be turned on by the gate signal from the gate line GL to provide a sensing signal to the initialization voltage line VIL. A gate electrode of the third transistor ST3 may be connected to the gate line GL, a drain electrode of the third transistor ST3 may be connected to the second node N2, and a source electrode of the third transistor ST3 may be connected to the initialization voltage line VIL. The drain electrode of the third transistor ST3 may be connected to the source electrode of the first transistor ST1 and the first electrode of the first light-emitting element ED1 through the second node N2. The drain electrode of the third transistor ST3 may be connected to the second capacitor electrode of the first capacitor C1.

Figure 5:
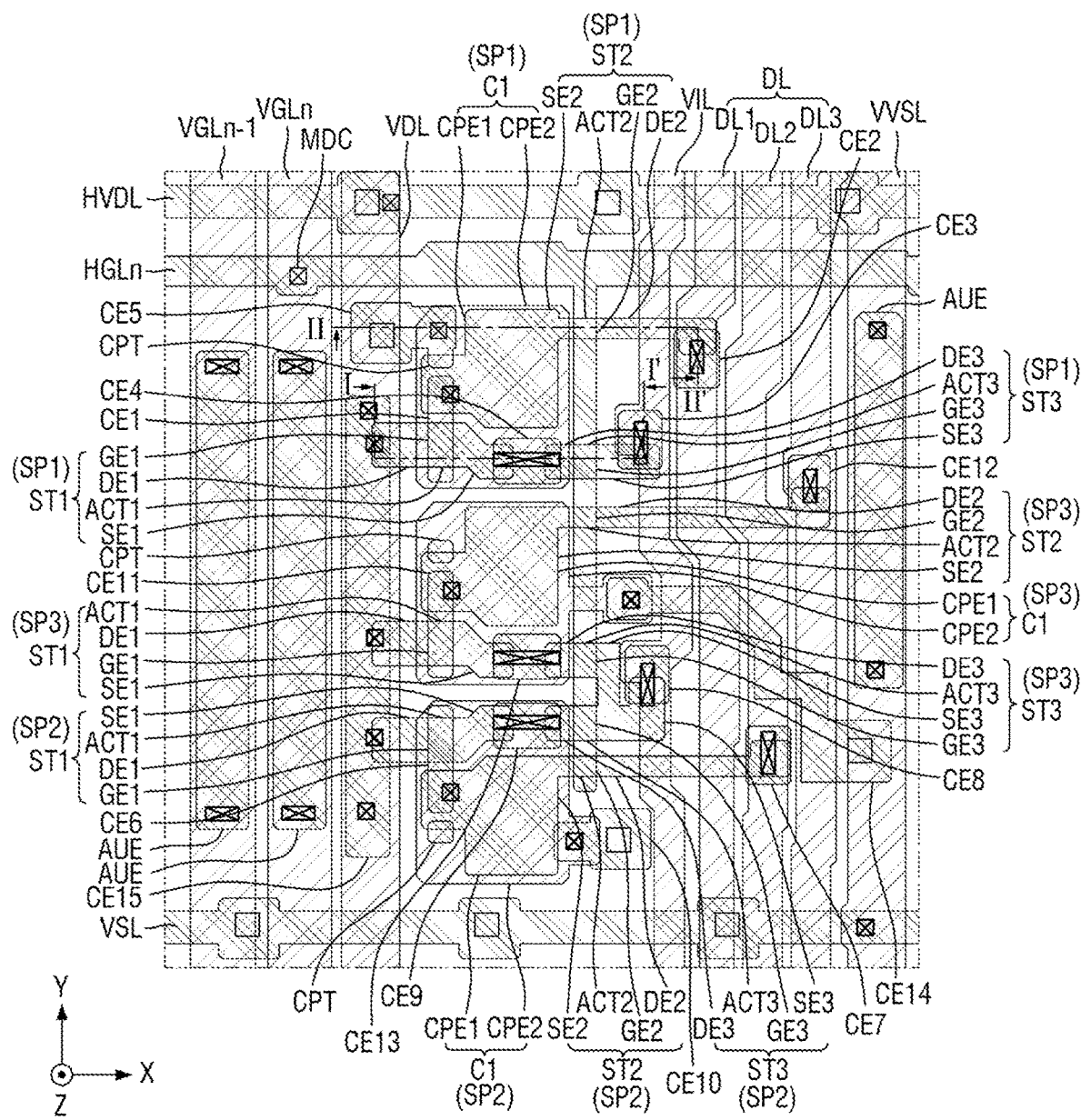
FIG. 5 is a plan view illustrating a part of a display area of the display device of FIG. 1.
Figure 6:
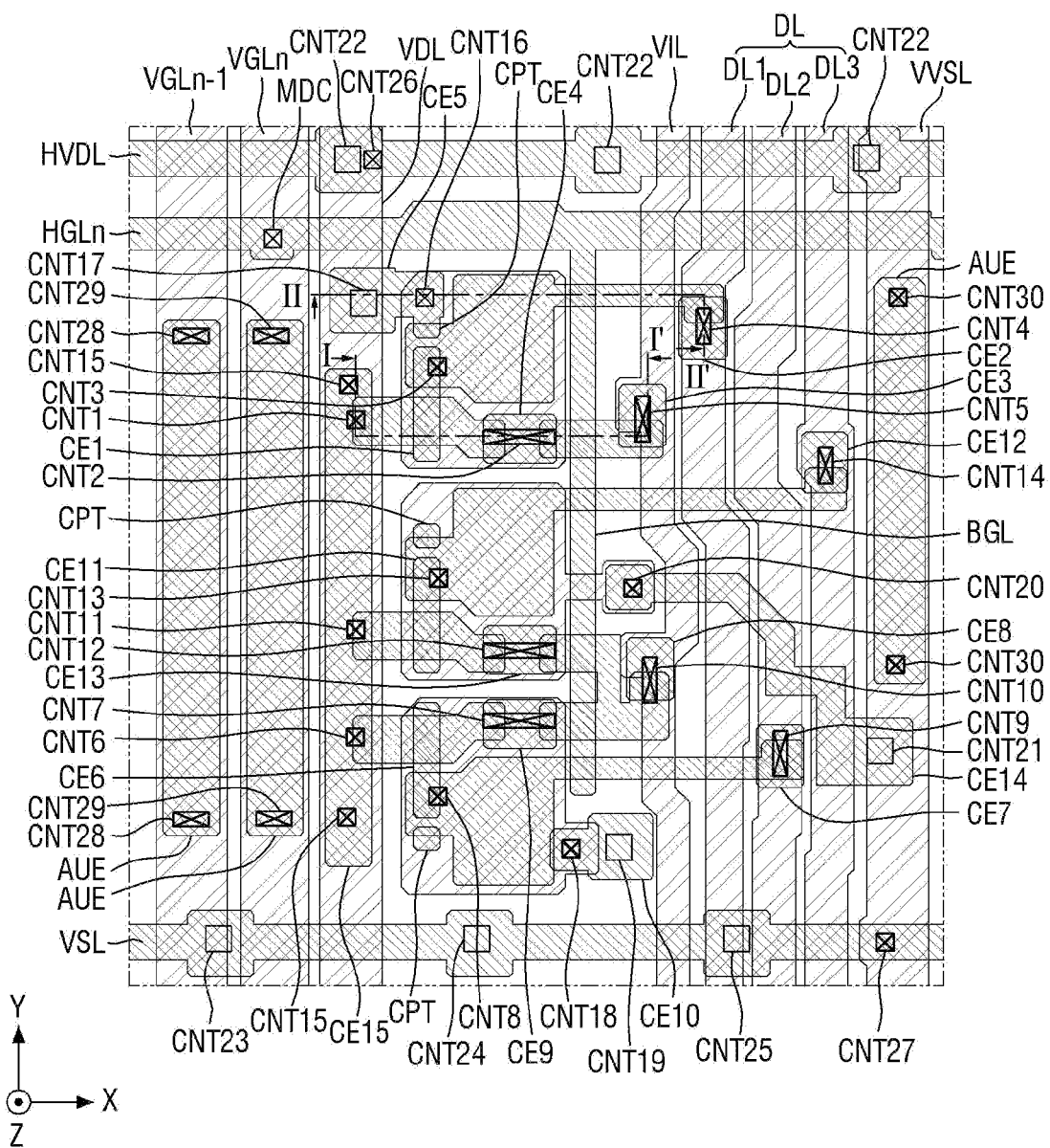
FIG. 6 is a plan view illustrating a part of a display area of the display device of FIG. 1.
Figure 7:
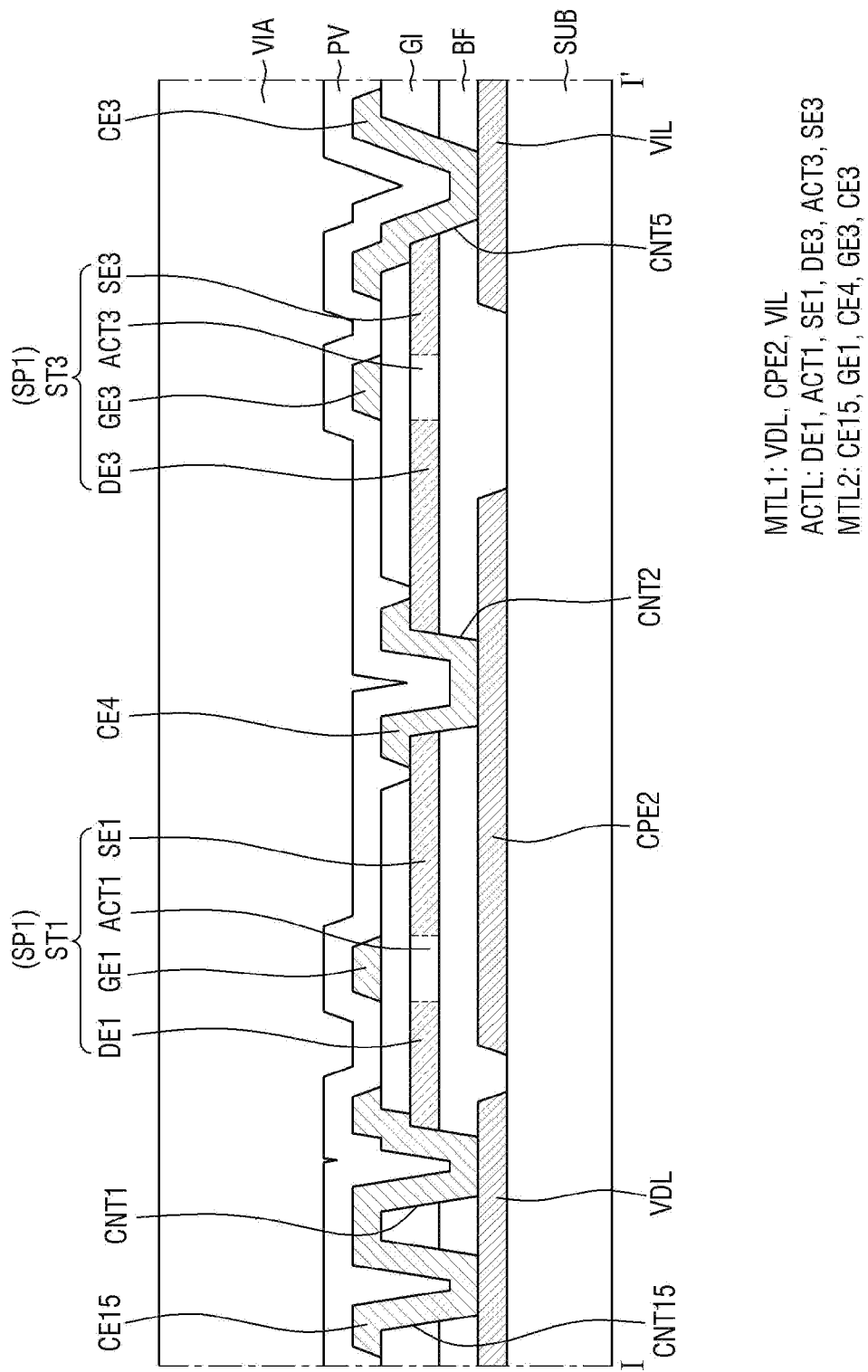
FIG. 7 is a schematic cross-sectional view taken along line I-I' of FIGS. 5 and 6.
Figure 8:
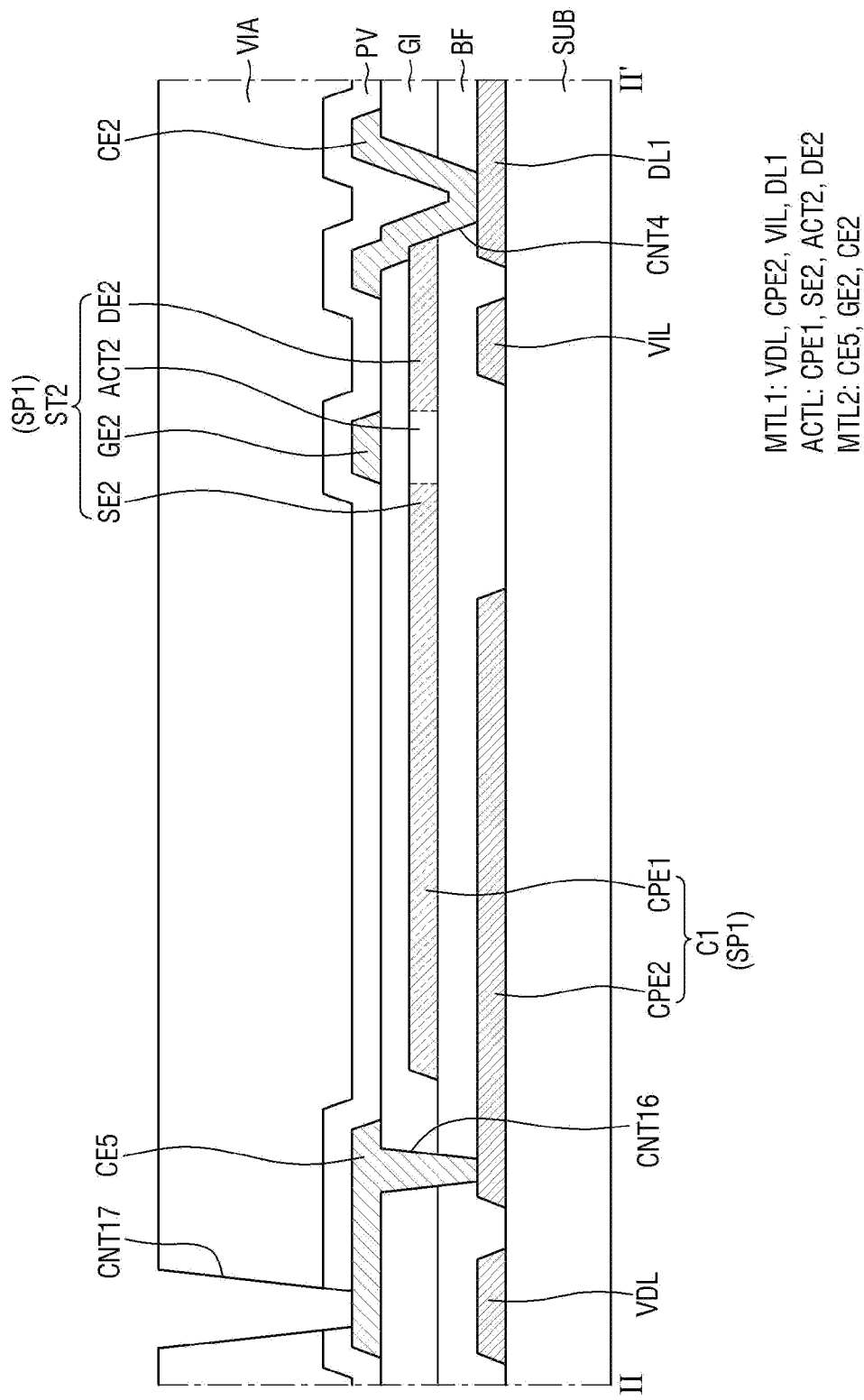
FIG. 8 is a schematic cross-sectional view taken along line II-II' of FIGS. 5 and 6.

FIGS. 5 and 6 are plan views illustrating parts of the display area of the display device of FIG. 1. FIG. 7 is a schematic cross-sectional view taken along line I-I' of FIGS. 5 and 6, and FIG. 8 is a schematic cross-sectional view taken along line II-IF of FIGS. 5 and 6.

Referring to FIGS. 5 through 8, the display area DA may include pixels SP, a first voltage line VDL, a horizontal voltage line HVDL, an initialization voltage line VIL, the (n−1)-th vertical gate line VGLn−1, the n-th vertical gate line VGLn, the n-th horizontal gate line HGLn, an auxiliary gate line BGL, data lines DL, a vertical voltage line VVSL, and a second voltage line VSL.

The pixels SP may include first, second, and third pixels SP1, SP2, and SP3. The pixel circuits of the first, third, and second pixels SP1, SP3, and SP2 may be arranged along the opposite direction of the second direction (or the Y-axis direction). The pixel circuits of the first, second, and third pixels SP1, SP2, and SP3 may be disposed in a pixel region.

The first voltage line VDL may be disposed in a first metal layer MTL1 on a substrate SUB. The first voltage line VDL may be disposed on the left sides of the pixel circuits of the first, second, and third pixels SP1, SP2, and SP3. The first voltage line VDL may overlap a fifteenth connection electrode CE15 of a second metal layer MTL2 in a thickness direction (or the Z-axis direction). The first voltage line VDL may be connected to the fifteenth connection electrode CE15 through a fifteenth contact hole CNT15. The first voltage line VDL may be connected to a drain electrode DE1 of a first transistor ST1 of the first pixel SP1 through a first contact hole CNT1. The fifteenth connection electrode CE15 may be connected to a drain electrode DE1 of a first transistor ST1 of the second pixel SP2 through a sixth contact hole CNT6. The fifteenth connection electrode CE15 may be connected to a drain electrode DE1 of a first transistor ST1 of the third pixel SP3 through an eleventh contact hole CNT11. Accordingly, the first voltage line VDL may provide driving voltages or high-potential voltages to the first, second, and third pixels SP1, SP2, and SP3 through the fifteenth connection electrode CE15.

The horizontal voltage line HVDL may be disposed in the second metal layer MTL2. The second metal layer MTL2 may be disposed on a gate insulating film GI, which covers an active layer ACTL. The horizontal voltage line HVDL may be disposed on the upper side of the n-th horizontal gate line HGLn. The horizontal voltage line HVDL may be connected to the first voltage line VDL through a twenty-sixth contact hole CNT26 to receive a driving voltage or a high-potential voltage. The horizontal voltage line HVDL may provide a driving voltage or a high-potential voltage to alignment electrodes of a third metal layer.

The initialization voltage line VIL may be disposed in the first metal layer MTL1. The initialization voltage line VIL may be disposed on the right side of the auxiliary gate line BGL. A third connection electrode CE3 of the second metal layer MTL2 may electrically connect the initialization voltage line VIL to a source electrode SE3 of a third transistor ST3 of the first pixel SP1 through a fifth contact hole CNT5. An eighth connection electrode CE8 of the second metal layer MTL2 may electrically connect the initialization voltage line VIL to a source electrode SE3 of a third transistor ST3 of the second pixel SP2 through a tenth contact hole CNT10. The eighth connection electrode CE8 may electrically connect the initialization voltage line VIL to a source electrode SE3 of a third transistor ST3 of the third pixel SP3 through the tenth contact hole CNT10. The source electrode SE3 of the third transistor ST3 of the second pixel SP2 and the source electrode SE3 of the third transistor ST3 of the third pixel SP3 may be integral with each other, but the disclosure is not limited thereto. Thus, the initialization voltage line VIL may provide an initialization voltage to the third transistors ST3 of the first, second, and third pixels SP1, SP2, and SP3 and may receive sensing signals from the third transistors ST3 of the first, second, and third pixels SP1, SP2, and SP3.

Multiple vertical gate lines VGL may be disposed in the first metal layer MTL1. The (n−1)-th and n-th vertical gate lines VGLn−1 and VGLn may be disposed on the left side of the first voltage line VDL. The (n−1)-th vertical gate line VGLn−1 may overlap an auxiliary electrode AUE of the second metal layer MTL2 in the thickness direction (or the Z-axis direction) and may be connected to the auxiliary electrode AUE through multiple twenty-eighth contact holes CNT28. As the (n−1)-th vertical gate line VGLn−1 is connected to the auxiliary electrode AUE, line resistance can be reduced.

The n-th vertical gate line VGLn may be connected to the n-th horizontal gate line HGLn through a contact MDC. The n-th vertical gate line VGLn may provide a gate signal to the n-th horizontal gate line HGLn. The n-th vertical gate line VGLn may overlap an auxiliary electrode AUE of the second metal layer MTL2 in the thickness direction (or the Z-axis direction) and may be connected to the auxiliary electrode AUE through multiple twenty-ninth contact holes CNT29. As the n-th vertical gate line VGLn−1 is connected to the auxiliary electrode AUE, line resistance can be reduced.

The n-th horizontal gate line HGLn may be disposed in the second metal layer MTL2. The n-th horizontal gate line HGLn may be disposed on the upper side of the pixel circuit of the first pixel SP1. The n-th horizontal gate line HGLn may be connected to the n-th vertical gate line VGLn, which is disposed in the first metal layer MTL1, through a contact MDC. The n-th horizontal gate line HGLn may provide the gate signal from the n-th vertical gate line VGLn to the auxiliary gate line BGL.

The auxiliary gate line BGL may be disposed in the second metal layer MTL2. The auxiliary gate line BGL may protrude in the opposite direction of the second direction (or the Y-axis direction) from the n-th horizontal gate line HGLn. The auxiliary gate line BGL and the n-th horizontal gate line HGLn may be integral with each other, but the disclosure is not limited thereto. The auxiliary gate line BGL may be disposed on the right sides of the pixel circuits of the first, second, and third pixels SP1, SP2, and SP3. The auxiliary gate line BGL may provide the gate signal from the n-th horizontal gate line HGLn to the second and third transistors ST2 and ST3 of each of the first, second, and third pixels SP1, SP2, and SP3.

The first data line DL1 may be disposed in the first metal layer MTL1. The first data line DL1 may be disposed on the right side of the initialization voltage line VIL. A second connection electrode CE2 of the second metal layer MTL2 may electrically connect the first data line DL1 to a drain electrode DE2 of the second transistor ST2 of the first pixel SP1 through a fourth contact hole CNT4. The first data line DL1 may provide a data voltage to the second transistor ST2 of the first pixel SP1.

The second data line DL2 may be disposed in the first metal layer MTL1. The second data line DL2 may be disposed on the right side of the first data line DL1. A seventh connection electrode CE7 of the second metal layer MTL2 may electrically connect the second data line DL2 to a drain electrode DE2 of the second transistor ST2 of the second pixel SP2 through a ninth contact hole CNT9. The second data line DL2 may provide a data voltage to the second transistor ST2 of the second pixel SP2.

The third data line DL3 may be disposed in the first metal layer MTL1. The third data line DL3 may be disposed on the right side of the second data line DL2. A twelfth connection electrode CE12 of the second metal layer MTL2 may electrically connect the third data line DL3 to a drain electrode DE2 of the second transistor ST2 of the third pixel SP3 through a fourteenth contact hole CNT14. The third data line DL3 may provide a data voltage to the second transistor ST2 of the third pixel SP3.

The vertical voltage line VVSL may be disposed in the first metal layer MTL1. The vertical voltage line VVSL may be disposed on the right side of the third data line DL3. The vertical voltage line VVSL may be connected to the second voltage line VSL of the second metal layer MTL2 through a twenty-seventh contact hole CNT27. The vertical voltage line VVSL may provide a low-potential voltage to the second voltage line VSL. The vertical voltage line VVSL may overlap an auxiliary electrode AUE of the second metal layer MTL2 in the thickness direction (or the Z-axis direction) and may be connected to the auxiliary electrode AUE through multiple thirtieth contact holes CNT30. As the vertical voltage line VVSL is connected to the auxiliary electrode AUE, line resistance can be reduced.

The second voltage line VSL may be disposed in the second metal layer MTL2. The second voltage line VSL may be disposed on the lower side of the pixel circuit of the second pixel SP2. The second voltage line VSL may provide the low-potential voltage from the vertical voltage line VVSL to second electrodes of the first, second, and third pixels SP1, SP2, and SP3. For example, the second voltage line VSL may be connected to the second electrode (RME2 in FIG. 16) of the third pixel SP3 through a twenty-third contact hole CNT23, may be connected to the second electrode (RME2 in FIG. 16) of the first pixel SP1 through a twenty-fourth contact hole CNT24, and may be connected to the second electrode (RME2 in FIG. 16) of the second pixel SP2 through a twenty-fifth contact hole CNT25. The second electrodes of the first, second, and third pixels SP1, SP2, and SP3 may be disposed in the third metal layer, and the twenty-third, twenty-fourth, and twenty-fifth contact holes CNT23, CNT24, and CNT25 may be formed through a via layer VIA and a passivation layer PV. The passivation layer PV may be disposed on the second metal layer MTL2 and the gate insulating film GI, and the via layer VIA may be disposed on the passivation layer PV.

The pixel circuit of the first pixel SP1 may include first, second, and third transistors ST1, ST2, and ST3. The first transistor ST1 of the first pixel SP1 may include an active region ACT1, a gate electrode GE1, a drain electrode DE1, and a source electrode SE1. The active region ACT1 of the first transistor ST1 may be disposed in the active layer ACTL and may overlap the gate electrode GE1 of the first transistor ST1 in the thickness direction (or the Z-axis direction). The active layer ACTL may be disposed on a buffer layer BF, which covers the first metal layer MTL1.

The gate electrode GE1 of the first transistor ST1 may be disposed in the second metal layer MTL2. The gate electrode GE1 of the first transistor ST1 and a first connection electrode CE1 may be integral with each other. The first connection electrode CE1 may be connected to a first capacitor electrode CPE1 of a first capacitor C1, which is disposed in the active layer ACTL, through a third contact hole CNT3. The first capacitor electrode CPE1 of the first capacitor C1 may be formed as a conductor by thermally treating the active layer ACTL. The first capacitor electrode CPE1 of the first capacitor C1 and a source electrode SE2 of the second transistor ST2 may be integral with each other, but the disclosure is not limited thereto.

The drain and source electrodes DE1 and SE1 of the first transistor ST1 may be formed as conductors by thermally treating the active layer ACTL. The drain and source electrodes DE1 and SE1 of the first transistor ST1 may be formed as N-type semiconductors, but the disclosure is not limited thereto. The fifteenth connection electrode CE15 may be connected to the drain electrode DE1 of the first transistor ST1 of the first pixel SP1 through the first contact hole CNT1. The fifteenth connection electrode CE15 may electrically connect the first voltage line VDL to the drain electrode DE1 of the first transistor ST1. The drain electrode DE1 of the first transistor ST1 may receive a driving voltage or a high-potential voltage from the first voltage line VDL.

A fourth connection electrode CE4 of the second metal layer MTL2 may electrically connect the source electrode SE1 of the first transistor ST1, a drain electrode DE3 of the third transistor ST3, and a second capacitor electrode CPE2 of the first metal layer MTL1 of the first pixel SP1 through a second contact hole CNT2. The first capacitor C1 may be formed between a first capacitor electrode CPE1 of the active layer ACTL and the second capacitor electrode CPE2 of the first metal layer MTL1.

A fifth connection electrode CE5 of the second metal layer MTL2 may be connected to the second capacitor electrode CPE2 through a sixteenth contact hole CNT16. The fifth connection electrode CE5 may be connected to a first electrode (RME1 in FIG. 16) of the first pixel SP1 through a seventeenth contact hole CNT17. The first electrode of the first pixel SP1 may be disposed in a third electrode layer, and the seventeenth contact hole CNT17 may be formed through the via layer VIA and the passivation layer PV.

A cover pattern CPT of the second metal layer MTL2 may be disposed on the upper side of the first connection electrode CE1. The cover pattern CPT may be spaced apart from the first connection electrode CE1 in the second direction (or the Y-axis direction). The cover pattern CPT may be spaced apart from the first connection electrode CE1 by a predetermined (or selectable) distance. Sides of the cover pattern CPT and the first connection electrode CE1 that are facing each other may overlap the first capacitor electrode CPE1 in the third direction (or the Z-axis direction). The cover pattern CPT of the first pixel SP1 and the fifth connection electrode CE5 may be integral with each other, but the disclosure is not limited thereto. The width of the cover pattern CPT may be substantially the same as the width of the first connection electrode CE1. For example, the left sides of the cover pattern CPT and the first connection electrode CE1 may fall on the same line extending in the second direction (or the Y-axis direction), for example, the left sides of the cover pattern CPT and the first connection electrode CE1 may be colinear with each other, but the disclosure is not limited thereto. For example, the right sides of the cover pattern CPT and the first connection electrode CE1 may fall on the same line extending in the second direction (or the Y-axis direction), for example, the right sides of the cover pattern CPT and the first connection electrode CE1 may be colinear with each other, but the disclosure is not limited thereto. The left side of the first capacitor electrode CPE1 may be disposed in line with the left side of the cover pattern CPT. Accordingly, even if the cover pattern CPT is aligned on the left side of a reference origin, the lower side of the cover pattern CPT and the upper side of the first connection electrode CE1 may overlap the first capacitor electrode CPE1.

The second transistor ST2 of the first pixel SP1 may include an active region ACT2, a gate electrode GE2, a drain electrode DE2, and a source electrode SE2. The active region ACT2 of the second transistor ST2 may be disposed in the active layer ACTL and may overlap the gate electrode GE2 of the second transistor ST2 in the thickness direction (or the Z-axis direction).

The gate electrode GE2 of the second transistor ST2 may be disposed in the second metal layer MTL2. The gate electrode GE2 of the second transistor ST2 may be a part of the auxiliary gate line BGL.

The drain and source electrodes DE2 and SE2 of the second transistor ST2 may be formed as conductors by thermally treating the active layer ACTL. The drain electrode DE2 of the second transistor ST2 may be electrically connected to the first data line DL1 through the second connection electrode CE2. The drain electrode DE2 of the second transistor ST2 may receive a data voltage for the first pixel SP1 from the first data line DL1.

The source electrode SE2 of the second transistor ST2 and the first capacitor electrode CPE1 of the first capacitor C1 may be integral with each other. The source electrode SE2 of the second transistor ST2 may be electrically connected to the gate electrode GE1 of the first transistor ST1 through the first capacitor electrode CPE1 and the first connection electrode CE1.

The third transistor ST3 of the first pixel SP1 may include an active region ACT3, a gate electrode GE3, a drain electrode DE3, and a source electrode SE3. The active region ACT3 of the third transistor ST3 may be disposed in the active layer ACTL and may overlap the gate electrode GE3 of the third transistor ST3 in the thickness direction (or the Z-axis direction).

The gate electrode GE3 of the third transistor ST3 may be disposed in the second metal layer MTL2. The gate electrode GE3 of the third transistor ST3 may be a part of the auxiliary gate line BGL.

The drain and source electrodes DE3 and SE3 of the third transistor ST3 may be formed as conductors by thermally treating the active layer ACTL. The drain electrode DE3 of the third transistor ST3 may be electrically connected to the source electrode SE1 of the first transistor ST1 and the second capacitor electrode CPE2 through the fourth connection electrode CE4.

The source electrode SE3 of the third transistor ST3 may be connected to the third connection electrode CE3 of the second metal layer MTL2 through the fifth contact hole CNT5. The third connection electrode CE3 may electrically connect the source electrode SE3 of the third transistor ST3 to the initialization voltage line VIL. The source electrode SE3 of the third transistor ST3 may receive an initialization voltage from the initialization voltage line VIL. The source electrode SE3 of the third transistor ST3 may provide a sensing signal to the initialization voltage line VIL.

The pixel circuit of the second pixel SP2 may include first, second, and third transistors ST1, ST2, and ST3. The first transistor ST1 of the second pixel SP2 may include an active region ACT1, a gate electrode GE1, a drain electrode DE1, and a source electrode SE1. The active region ACT1 of the first transistor ST1 may be disposed in the active layer ACTL and may overlap the gate electrode GE1 of the first transistor ST1 in the thickness direction (or the Z-axis direction).

The gate electrode GE1 of the first transistor ST1 may be disposed in the second metal layer MTL2. The gate electrode GE1 of the first transistor ST1 and a sixth connection electrode CE 6 may be integral with each other. The sixth connection electrode CE6 may be connected to a first capacitor electrode CPE1 of a first capacitor C1, which is disposed in the active layer ACTL, through an eighth contact hole CNT8. The first capacitor electrode CPE1 of the first capacitor electrode CPE1 may be formed as a conductor by thermally treating the active layer ACTL. The first capacitor electrode CPE1 of the first capacitor C1 and a source electrode SE2 of the second transistor ST2 may be integral with each other, but the disclosure is not limited thereto.

The drain and source electrodes DE1 and SE1 of the first transistor ST1 may be formed as conductors by thermally treating the active layer ACTL. The drain and source electrodes DE1 and SE1 of the first transistor ST1 may be formed as N-type semiconductors, but the disclosure is not limited thereto. The fifteenth connection electrode CE15 may be connected to the drain electrode DE1 of the first transistor ST1 through the sixth contact hole CNT6. The fifteenth connection electrode CE15 may electrically connect the first voltage line VDL to the drain electrode DE1 of the first transistor ST1. The drain electrode DE1 of the first transistor ST1 may receive a driving voltage or a high-potential voltage from the first voltage line VDL.

A ninth connection electrode CE9 of the second metal layer MTL2 may electrically connect the source electrode SE1 of the first transistor ST1, a drain electrode DE3 of the third transistor ST3, and a second capacitor electrode CPE2 of the first metal layer MTL1 through a seventh contact hole CNT7. The first capacitor C1 may be formed between a first capacitor electrode CPE1 of the active layer ACTL and the second capacitor electrode CPE2 of the first metal layer MTL1.

A tenth connection electrode CE10 of the second metal layer MTL2 may be connected to the second capacitor electrode CPE2 through an eighteenth contact hole CNT18. The tenth connection electrode CE10 may be connected to a first electrode (RME1 in FIG. 16) of the second pixel SP2 through a nineteenth contact hole CNT19. The first electrode of the second pixel SP2 may be disposed in the third electrode layer, and the nineteenth contact hole CNT19 may be formed through the via layer VIA and the passivation layer PV.

A cover pattern CPT of the second metal layer MTL2 may be disposed on the lower side of the sixth connection electrode CE6. The cover pattern CPT may be spaced apart from the sixth connection electrode CE6 in the opposite direction of the second direction (or the Y-axis direction). The distance between the cover pattern CPT and the sixth connection electrode CE6 may be substantially the same as the distance between the cover pattern CPT of the first pixel SP1 and the first connection electrode CE1, but the disclosure is not limited thereto. Sides of the cover pattern CPT and the sixth connection electrode CE6 that are facing each other may overlap the first capacitor electrode CPE1 in the third direction (or the Z-axis direction). For example, the cover pattern CPT may be electrically floated from the fifteenth connection electrode CE15, but the disclosure is not limited thereto. In another embodiment, the cover pattern CPT and the fifteenth connection electrode CE15 may be integral with each other, in which case, a part connecting the cover pattern CPT and the fifteenth connection electrode CE15 may not overlap the first capacitor electrode CPE1.

The width of the cover pattern CPT may be substantially the same as the width of the sixth connection electrode CE6. For example, the left sides of the cover pattern CPT and the sixth connection electrode CE6 may fall on the same line extending in the second direction (or the Y-axis direction), for example, the left sides of the cover pattern CPT and the sixth connection electrode CE6 may be colinear with each other, but the disclosure is not limited thereto. For example, the right sides of the cover pattern CPT and the sixth connection electrode CE6 may fall on the same line extending in the second direction (or the Y-axis direction), for example, the right sides of the cover pattern CPT and the sixth connection electrode CE6 may be colinear with each other, but the disclosure is not limited thereto. The left side of the first capacitor electrode CPE1 may be disposed in line with the left side of the cover pattern CPT. Accordingly, even if the cover pattern CPT is aligned on the left side of a reference origin, the upper side of the cover pattern CPT and the lower side of the sixth connection electrode CE6 may overlap the first capacitor electrode CPE1.

The second transistor ST2 of the second pixel SP2 may include an active region ACT2, a gate electrode GE2, a drain electrode DE2, and a source electrode SE2. The active region ACT2 of the second transistor ST2 may be disposed in the active layer ACTL and may overlap the gate electrode GE2 of the second transistor ST2 in the thickness direction (or the Z-axis direction).

The gate electrode GE2 of the second transistor ST2 may be disposed in the second metal layer MTL2. The gate electrode GE2 of the second transistor ST2 may be a part of the auxiliary gate line BGL.

The drain and source electrodes DE2 and SE2 of the second transistor ST2 may be formed as conductors by thermally treating the active layer ACTL. The drain electrode DE2 of the second transistor ST2 may be electrically connected to the second data line DL2 through a seventh connection electrode CE7. The drain electrode DE2 of the second transistor ST2 may receive a data voltage for the second pixel SP2 from the second data line DL2.

The source electrode SE2 of the second transistor ST2 and the first capacitor electrode CPE1 of the first capacitor C1 may be integral with each other. The source electrode SE2 of the second transistor ST2 may be electrically connected to the gate electrode GE1 of the first transistor ST1 through the first capacitor electrode CPE1 and the sixth connection electrode CE6.

The third transistor ST3 of the second pixel SP2 may include an active region ACT3, a gate electrode GE3, a drain electrode DE3, and a source electrode SE3. The active region ACT3 of the third transistor ST3 may be disposed in the active layer ACTL and may overlap the gate electrode GE3 of the third transistor ST3 in the thickness direction (or the Z-axis direction).

The gate electrode GE3 of the third transistor ST3 may be disposed in the second metal layer MTL2. The gate electrode GE3 of the third transistor ST3 may be a part of the auxiliary gate line BGL.

The drain and source electrodes DE3 and SE3 of the third transistor ST3 may be formed as conductors by thermally treating the active layer ACTL. The drain electrode DE3 of the third transistor ST3 may be electrically connected to the source electrode SE1 of the first transistor ST1 and the second capacitor electrode CPE2 through the ninth connection electrode CE9.

The source electrode SE3 of the third transistor ST3 may be connected to the eighth connection electrode CE8 of the second metal layer MTL2 through the tenth contact hole CNT10. The eighth connection electrode CE8 may electrically connect the source electrode SE3 of the third transistor ST3 to the initialization voltage line VIL. The source electrode SE3 of the third transistor ST3 may receive an initialization voltage from the initialization voltage line VIL. The source electrode SE3 of the third transistor ST3 may provide a sensing signal to the initialization voltage line VIL.

The pixel circuit of the third pixel SP3 may include first, second, and third transistors ST1, ST2, and ST3. The first transistor ST1 of the third pixel SP3 may include an active region ACT1, a gate electrode GE1, a drain electrode DE1, and a source electrode SE1. The active region ACT1 of the first transistor ST1 may be disposed in the active layer ACTL and may overlap the gate electrode GE1 of the first transistor ST1 in the thickness direction (or the Z-axis direction).

The gate electrode GE1 of the first transistor ST1 may be disposed in the second metal layer MTL2. The gate electrode GE1 of the first transistor ST1 and an eleventh connection electrode CE11 may be integral with each other. The eleventh connection electrode CE11 may be connected to a first capacitor electrode CPE1 of a first capacitor C1, which is disposed in the active layer ACTL, through a thirteenth contact hole CNT13. The first capacitor electrode CPE1 of the first capacitor C1 may be formed as a conductor by thermally treating the active layer ACTL. The first capacitor electrode CPE1 of the first capacitor C1 and a source electrode SE2 of the second transistor ST2 may be integral with each other, but the disclosure is not limited thereto.

The drain and source electrodes DE1 and SE1 of the first transistor ST1 may be formed as conductors by thermally treating the active layer ACTL. The drain and source electrodes DE1 and SE1 of the first transistor ST1 may be formed as N-type semiconductors, but the disclosure is not limited thereto. The fifteenth connection electrode CE15 may be connected to the drain electrode DE1 of the first transistor ST1 through the eleventh contact hole CNT11. The fifteenth connection electrode CE15 may electrically connect the first voltage line VDL to the drain electrode DE1 of the first transistor ST1. The drain electrode DE1 of the first transistor ST1 may receive a driving voltage or a high-potential voltage from the first voltage line VDL.

A thirteenth connection electrode CE13 of the second metal layer MTL2 may electrically connect the source electrode SE1 of the first transistor ST1, a drain electrode DE3 of the third transistor ST3, and a second capacitor electrode CPE2 of the first metal layer MTL1 through a twelfth contact hole CNT12. The first capacitor C1 may be formed between a first capacitor electrode CPE1 of the active layer ACTL and the second capacitor electrode CPE2 of the first metal layer MTL1.

A fourteenth connection electrode CE14 of the second metal layer MTL2 may be connected to the second capacitor electrode CPE2 through a twentieth contact hole CNT20. The fourteenth connection electrode CE14 may be connected to a first electrode (RME1 in FIG. 16) of the third pixel SP3 through a twenty-first contact hole CNT21. The first electrode of the third pixel SP3 may be disposed in the third electrode layer, and the twenty-first contact hole CNT21 may be formed through the via layer VIA and the passivation layer PV.

A cover pattern CPT of the second metal layer MTL2 may be disposed on the upper side of the eleventh connection electrode CE11. The cover pattern CPT may be spaced apart from the eleventh connection electrode CE11 in the second direction (or the Y-axis direction). The distance between the cover pattern CPT and the eleventh connection electrode CE11 may be substantially the same as the distance between the cover pattern CPT of the second pixel SP2 and the sixth connection electrode CE6, but the disclosure is not limited thereto. Sides of the cover pattern CPT and the eleventh connection electrode CE11 that are facing each other may overlap the first capacitor electrode CPE1 in the third direction (or the Z-axis direction). For example, the cover pattern CPT may be electrically floated from the fifteenth connection electrode CE15, but the disclosure is not limited thereto. In another embodiment, the cover pattern CPT and the fifteenth connection electrode CE15 may be integral with each other, in which case, a part connecting the cover pattern CPT and the fifteenth connection electrode CE15 may not overlap the first capacitor electrode CPE1.

The width of the cover pattern CPT may be substantially the same as the width of the eleventh connection electrode CE11. For example, the left sides of the cover pattern CPT and the eleventh connection electrode CE11 may fall on the same line extending in the second direction (or the Y-axis direction), for example, the left sides of the cover pattern CPT and the eleventh connection electrode CE11 may be colinear with each other, but the disclosure is not limited thereto. For example, the right sides of the cover pattern CPT and the eleventh connection electrode CE11 may fall on the same line extending in the second direction (or the Y-axis direction), for example, the right sides of the cover pattern CPT and the eleventh connection electrode CE11 may be colinear with each other, but the disclosure is not limited thereto. The left side of the first capacitor electrode CPE1 may be disposed in line with the left side of the cover pattern CPT. Accordingly, even if the cover pattern CPT is aligned on the left side of a reference origin, the lower side of the cover pattern CPT and the upper side of the eleventh connection electrode CE11 may overlap the first capacitor electrode CPE1.

The second transistor ST2 of the third pixel SP3 may include an active region ACT2, a gate electrode GE2, a drain electrode DE2, and a source electrode SE2. The active region ACT2 of the second transistor ST2 may be disposed in the active layer ACTL and may overlap the gate electrode GE2 of the second transistor ST2 in the thickness direction (or the Z-axis direction).

The gate electrode GE2 of the second transistor ST2 may be disposed in the second metal layer MTL2. The gate electrode GE2 of the second transistor ST2 may be a part of the auxiliary gate line BGL.

The drain and source electrodes DE2 and SE2 of the second transistor ST2 may be formed as conductors by thermally treating the active layer ACTL. The drain electrode DE2 of the second transistor ST2 may be electrically connected to the third data line DL3 through the twelfth connection electrode CE12. The drain electrode DE2 of the second transistor ST2 may receive a data voltage for the third pixel SP3 from the third data line DL3.

The source electrode SE2 of the second transistor ST2 and the first capacitor electrode CPE1 of the first capacitor C1 may be integral with each other. The source electrode SE2 of the second transistor ST2 may be electrically connected to the gate electrode GE1 of the first transistor ST1 through the first capacitor electrode CPE1 and the eleventh connection electrode CE11.

The third transistor ST3 of the third pixel SP3 may include an active region ACT3, a gate electrode GE3, a drain electrode DE3, and a source electrode SE3. The active region ACT3 of the third transistor ST3 may be disposed in the active layer ACTL and may overlap the gate electrode GE3 of the third transistor ST3 in the thickness direction (or the Z-axis direction).

The gate electrode GE3 of the third transistor ST3 may be disposed in the second metal layer MTL2. The gate electrode GE3 of the third transistor ST3 may be a part of the auxiliary gate line BGL.

The drain and source electrodes DE3 and SE3 of the third transistor ST3 may be formed as conductors by thermally treating the active layer ACTL. The drain electrode DE3 of the third transistor ST3 may be electrically connected to the source electrode SE1 of the first transistor ST1 and the second capacitor electrode CPE2 through the thirteenth connection electrode CE13.

The source electrode SE3 of the third transistor ST3 may be connected to the eighth connection electrode CE8 of the second metal layer MTL2 through the tenth contact hole CNT10. The eighth connection electrode CE8 may electrically connect the source electrode SE3 of the third transistor ST3 to the initialization voltage line VIL. The source electrode SE3 of the third transistor ST3 may receive an initialization voltage from the initialization voltage line VIL. The source electrode SE3 of the third transistor ST3 may provide a sensing signal to the initialization voltage line VIL.

Figure 9:
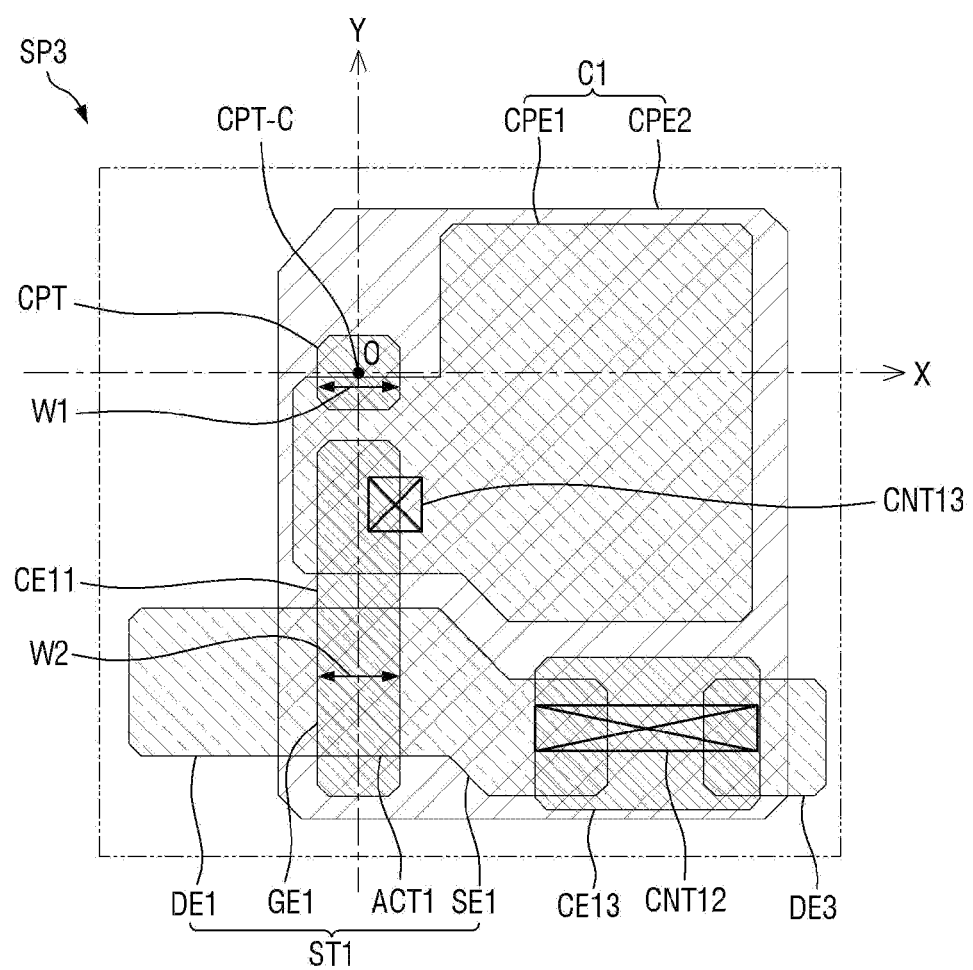
FIG. 9 is a plan view illustrating a layout of an active layer and a second metal layer in the display device of FIG. 1.

FIG. 9 is a plan view illustrating a layout of the active layer and the second metal layer in the display device of FIG. 1. FIG. 9 is an enlarged plan view illustrating a part of the pixel circuit of the third pixel SP3 of FIG. 5. Descriptions of features or elements that have already been described above will be omitted or simplified.

Referring to FIG. 9, a center CPT_C of the cover pattern CPT of the third pixel SP3 may substantially coincide with a reference origin O. The reference origin O may be located at the intersection between X- and Y-axes passing through the cover pattern CPT. The reference origin O of FIG. 9 may coincide with reference origins O of FIGS. 10 through 13. The second metal layer MTL2 may be disposed on the active layer ACTL by aligning the center CPT-C of the cover pattern CPT with the reference origin O. The cover pattern CPT of the third pixel SP3 may be disposed on the upper side of the eleventh connection electrode CE11. The cover pattern CPT may be spaced apart from the eleventh connection electrode CE11 in the second direction (or the Y-axis direction). The cover pattern CPT and the eleventh connection electrode CE11 may be symmetrical with respect to the Y axis, but the disclosure is not limited thereto. The distance between the cover pattern CPT and the eleventh connection electrode CE11 may be substantially the same as the distance between the cover pattern CPT of the second pixel SP2 and the sixth connection electrode CE6, but the disclosure is not limited thereto. For example, the cover pattern CPT may be electrically floated, but the disclosure is not limited thereto. In another embodiment, the cover pattern CPT and the fifteenth connection electrode CE15 may be integral with each other, in which case, a part connecting the cover pattern CPT and the fifteenth connection electrode CE15 may not overlap the first capacitor electrode CPE1.

A first width W1 of the cover pattern CPT may be substantially the same as a second width W2 of the eleventh connection electrode CE11. For example, the left sides of the cover pattern CPT and the eleventh connection electrode CE11 may fall on a same line extending in the second direction (or the Y-axis direction), for example, the left sides of the cover pattern CPR and the eleventh connection electrode CE11 may be colinear with each other, but the disclosure is not limited thereto. For example, the right sides of the cover pattern CPT and the eleventh connection electrode CE11 may fall on the same line extending in the second direction (or the Y-axis direction), for example the right sides of the cover pattern CPT and the eleventh connection electrode CE11 may be colinear with each other, but the disclosure is not limited thereto. The left side of the first capacitor electrode CPE1 may be disposed in line with the left side of the cover pattern CPT. Thus, the lower side of the cover pattern CPCT may overlap the first capacitor electrode CPE1.

Figure 10:
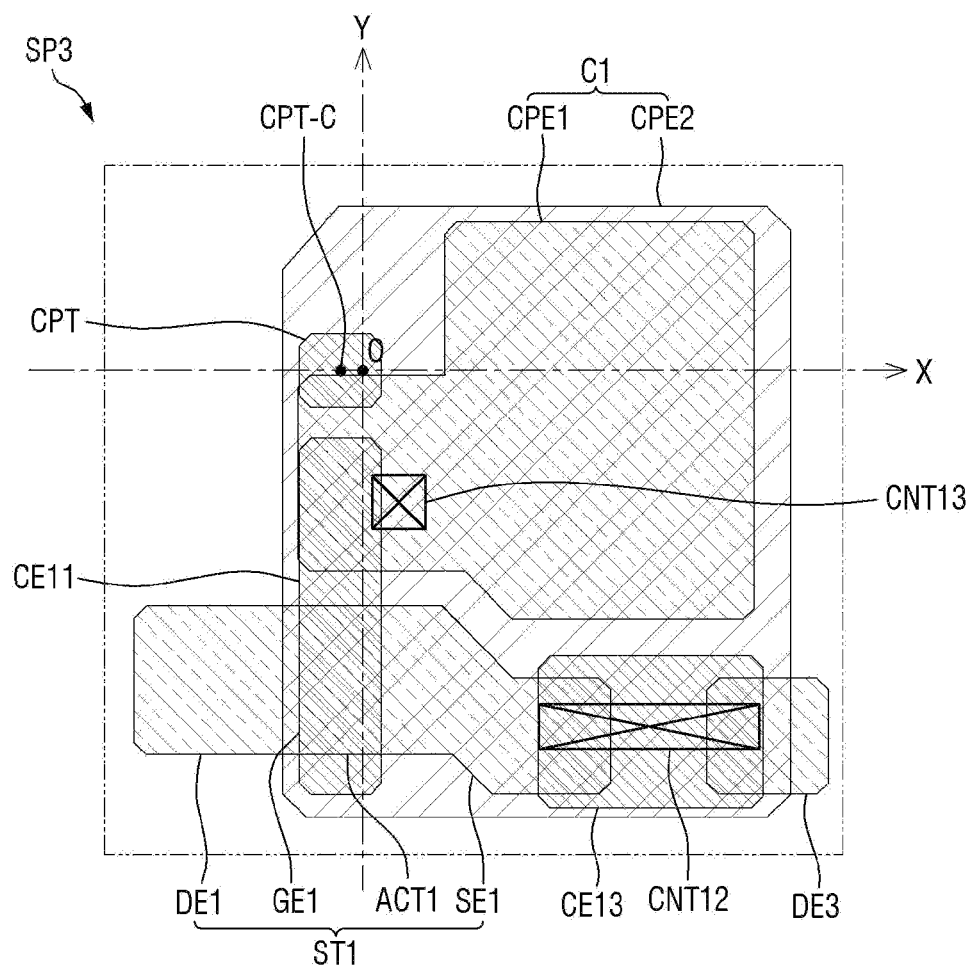
FIG. 10 is a plan view illustrating a layout of the active layer and the second metal layer in the display device of FIG. 1.

FIG. 10 is a plan view illustrating a layout of the active layer and the second metal layer in the display device of FIG. 1.

Referring to FIG. 10, the center CPT_C of the cover pattern CPT of the third pixel SP3 may be disposed on the left side of the reference origin O. The second metal layer MTL2 may be disposed on the left side of the active layer ACTL due to error. Even if error occurs during the alignment of the second metal layer MTL2, the left side of the cover pattern CPT may not be disposed beyond the left side of the first capacitor electrode CPE1. The overlapping area of the first capacitor electrode CPE1 with the cover pattern CPT and the eleventh connection electrode CE11 of FIG. 10 may be substantially the same as the overlapping area of the first capacitor electrode CPE1 with the cover pattern CPT and the eleventh connection electrode CE11 of FIG. 9. For example, a part of the first capacitor electrode CPE1 not overlapping the second metal layer MTL2 may be formed as a conductor with an N-type semiconductor. The size of the conductor part of the first capacitor electrode CPE1 may determine the capacitance of the first capacitor C1. The capacitance of the first capacitor C1 of FIG. 10 may be substantially the same as the capacitance of the first capacitor C1 of FIG. 9. As the cover pattern CPT, which is distanced apart from the eleventh connection electrode CE11 and has the same width as the eleventh connection electrode CE11, is provided, the capacitance of the first capacitor C1 can be uniformly maintained even if error occurs during the alignment of the second metal layer MTL2.

Figure 11:
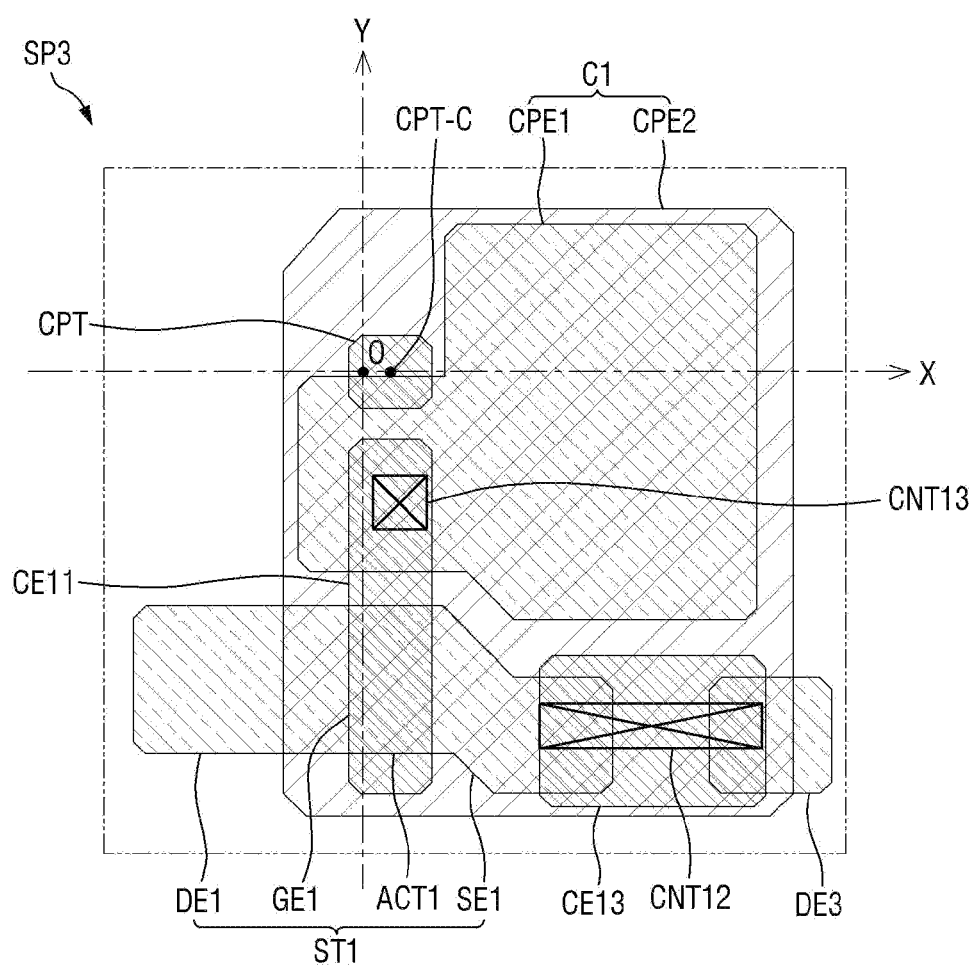
FIG. 11 is a plan view illustrating a layout of the active layer and the second metal layer in the display device of FIG. 1.

FIG. 11 is a plan view illustrating a layout of the active layer and the second metal layer in the display device of FIG. 1.

Referring to FIG. 11, the center CPT_C of the cover pattern CPT of the third pixel SP3 may be disposed on the right side of the reference origin O. The second metal layer MTL2 may be disposed on the right side of the active layer ACTL due to error. The overlapping area of the first capacitor electrode CPE1 with the cover pattern CPT and the eleventh connection electrode CE11 of FIG. 11 may be substantially the same as the overlapping area of the first capacitor electrode CPE1 with the cover pattern CPT and the eleventh connection electrode CE11 of FIG. 9. For example, a part of the first capacitor electrode CPE1 not overlapping the second metal layer MTL2 may be formed as a conductor with an N-type semiconductor. The size of the conductor part of the first capacitor electrode CPE1 may determine the capacitance of the first capacitor C1. The capacitance of the first capacitor C1 of FIG. 11 may be substantially the same as the capacitance of the first capacitor C1 of FIG. 9. As the cover pattern CPT, which is distanced apart from the eleventh connection electrode CE11 and has the same width as the eleventh connection electrode CE11, is provided, the capacitance of the first capacitor C1 can be uniformly maintained even if error occurs during the alignment of the second metal layer MTL2.

Figure 12:
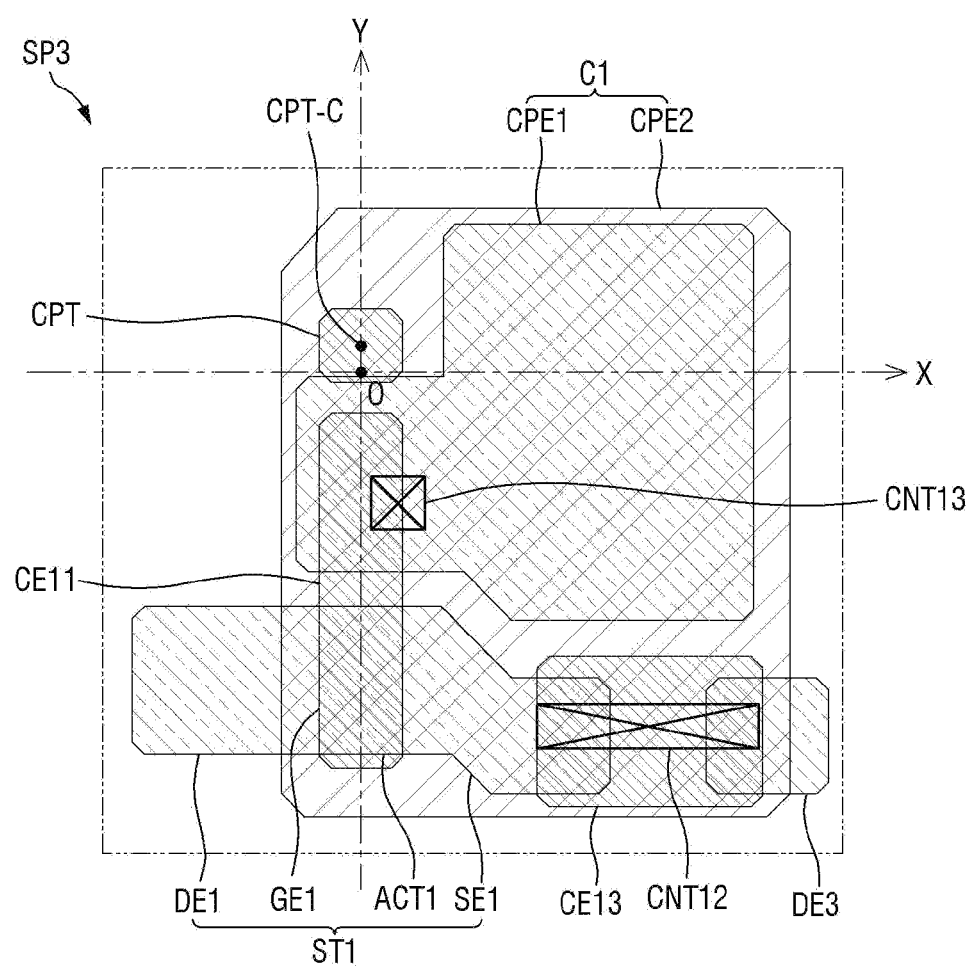
FIG. 12 is a plan view illustrating a layout of the active layer and the second metal layer in the display device of FIG. 1.

FIG. 12 is a plan view illustrating a layout of the active layer and the second metal layer in the display device of FIG. 1.

Referring to FIG. 12, the center CPT_C of the cover pattern CPT of the third pixel SP3 may be disposed on the upper side of the reference origin O. The second metal layer MTL2 may be disposed on the upper side of the active layer ACTL due to error. The overlapping area of the eleventh connection electrode CE11 and the first capacitor CPE1 of FIG. 12 may be increased from the overlapping area of the eleventh connection electrode CE11 and the first capacitor CPE1 of FIG. 9 by an amount of which the overlapping area between the cover pattern CPT and the eleventh connection electrode CE11 of FIG. 12 is reduced from the overlapping area between the cover pattern CPT and the eleventh connection electrode CE11 of FIG. 9. The overlapping area of the first capacitor electrode CPE1 with the cover pattern CPT and the eleventh connection electrode CE11 of FIG. 12 may be substantially the same as the overlapping area of the first capacitor electrode CPE1 with the cover pattern CPT and the eleventh connection electrode CE11 of FIG. 9. For example, a part of the first capacitor electrode CPE1 not overlapping the second metal layer MTL2 may be formed as a conductor with an N-type semiconductor. The size of the conductor part of the first capacitor electrode CPE1 may determine the capacitance of the first capacitor C1. The capacitance of the first capacitor C1 of FIG. 12 may be substantially the same as the capacitance of the first capacitor C1 of FIG. 9. As the cover pattern CPT, which is distanced apart from the eleventh connection electrode CE11 and has the same width as the eleventh connection electrode CE11, is provided, the capacitance of the first capacitor C1 can be uniformly maintained even if error occurs during the alignment of the second metal layer MTL2.

Figure 13:
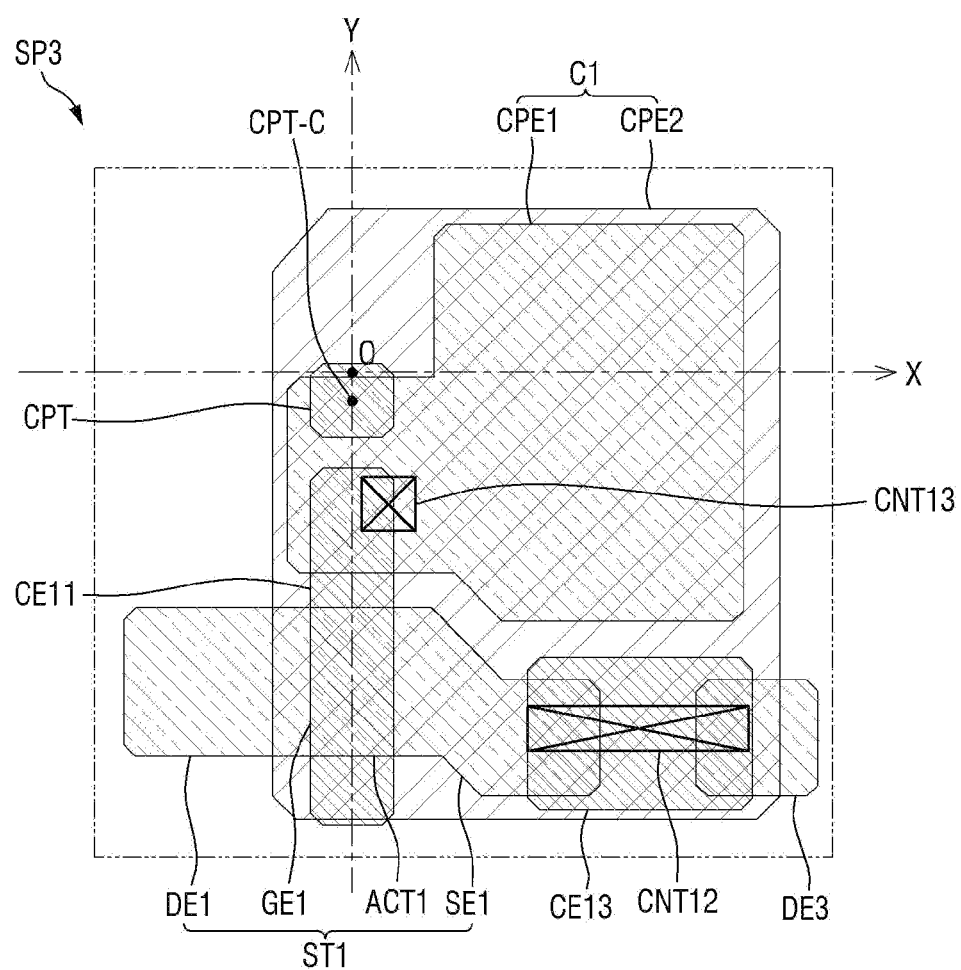
FIG. 13 is a plan view illustrating a layout of the active layer and the second metal layer in the display device of FIG. 1.

FIG. 13 is a plan view illustrating a layout of the active layer and the second metal layer in the display device of FIG. 1.

Referring to FIG. 13, the center CPT_C of the cover pattern CPT of the third pixel SP3 may be disposed on the lower side of the reference origin O. The second metal layer MTL2 may be disposed on the lower side of the active layer ACTL due to error. The overlapping area of the eleventh connection electrode CE11 and the first capacitor CPE1 of FIG. 13 may be increased from the overlapping area of the eleventh connection electrode CE11 and the first capacitor CPE1 of FIG. 9 by an amount of which the overlapping area of the cover pattern CPT and the eleventh connection electrode CE11 of FIG. 13 is reduced from the overlapping area of the cover pattern CPT and the eleventh connection electrode CE11 of FIG. 9. The overlapping area of the first capacitor electrode CPE1 with the cover pattern CPT and the eleventh connection electrode CE11 of FIG. 13 may be substantially the same as the overlapping area of the first capacitor electrode CPE1 with the cover pattern CPT and the eleventh connection electrode CE11 of FIG. 9. For example, a part of the first capacitor electrode CPE1 not overlapping the second metal layer MTL2 may be formed as a conductor with an N-type semiconductor. The size of the conductor part of the first capacitor electrode CPE1 may determine the capacitance of the first capacitor C1. The capacitance of the first capacitor C1 of FIG. 13 may be substantially the same as the capacitance of the first capacitor C1 of FIG. 9. As the cover pattern CPT, which is distanced apart from the eleventh connection electrode CE11 and has the same width as the eleventh connection electrode CE11, is provided, the capacitance of the first capacitor C1 can be uniformly maintained even if error occurs during the alignment of the second metal layer MTL2.

Figure 14:
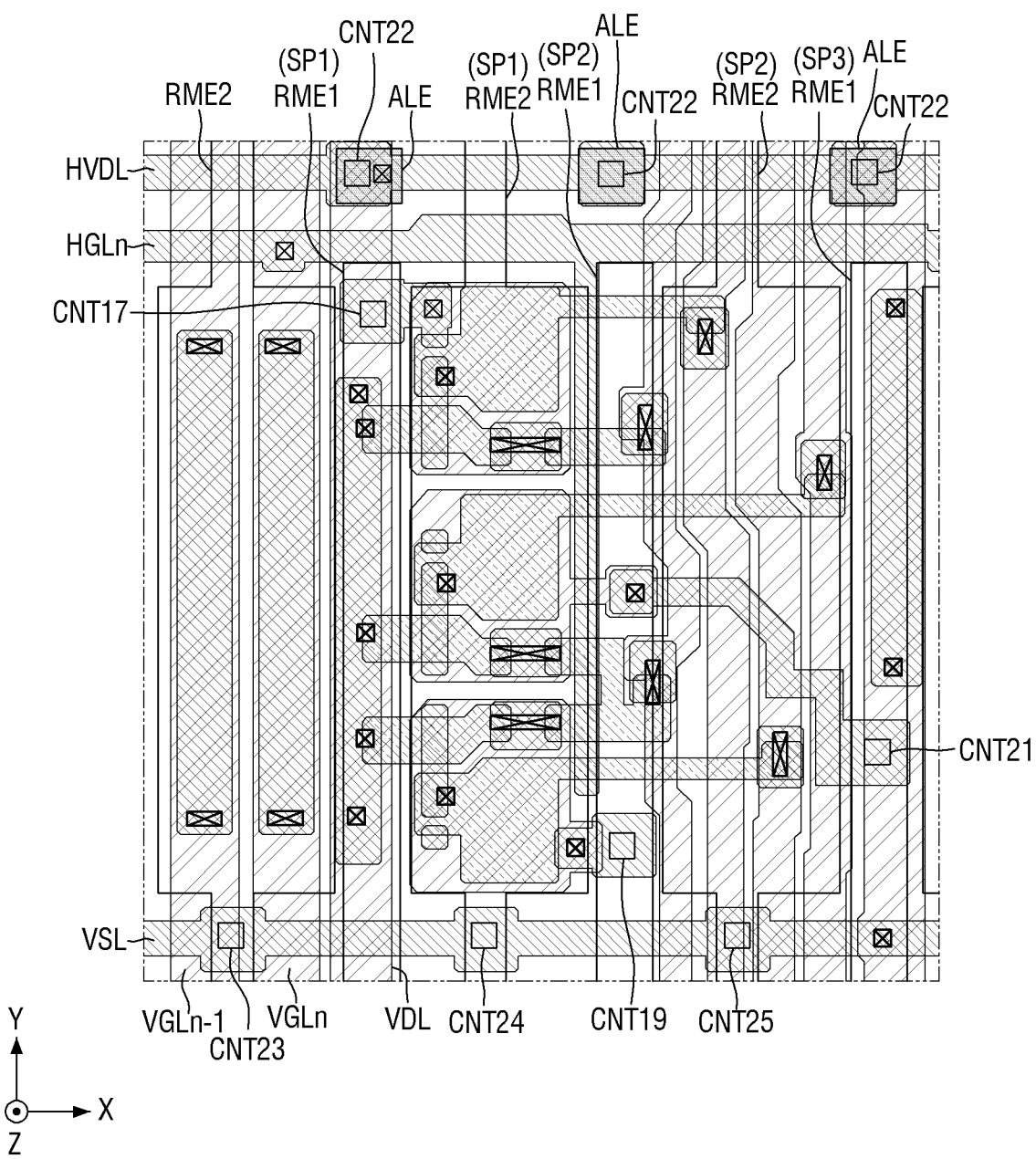
FIG. 14 is a plan view illustrating a layout of a first metal layer, the active layer, the second metal layer, and a third metal layer of the display device of FIG. 1.
Figure 15:
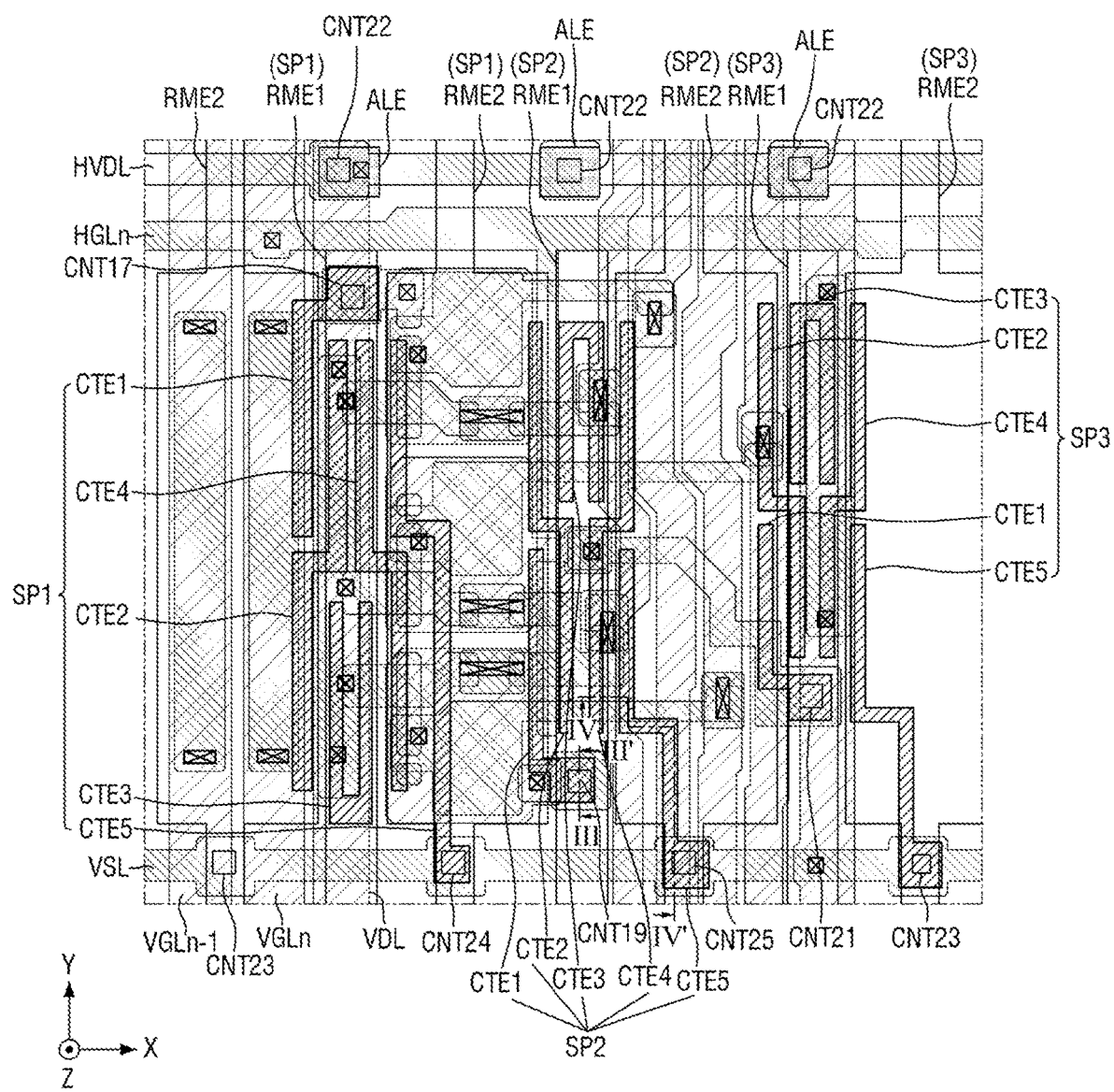
FIG. 15 is a plan view illustrating a layout of the first metal layer, the active layer, the second metal layer, the third metal layer, and a fourth metal layer of the display device of FIG. 1.
Figure 16:
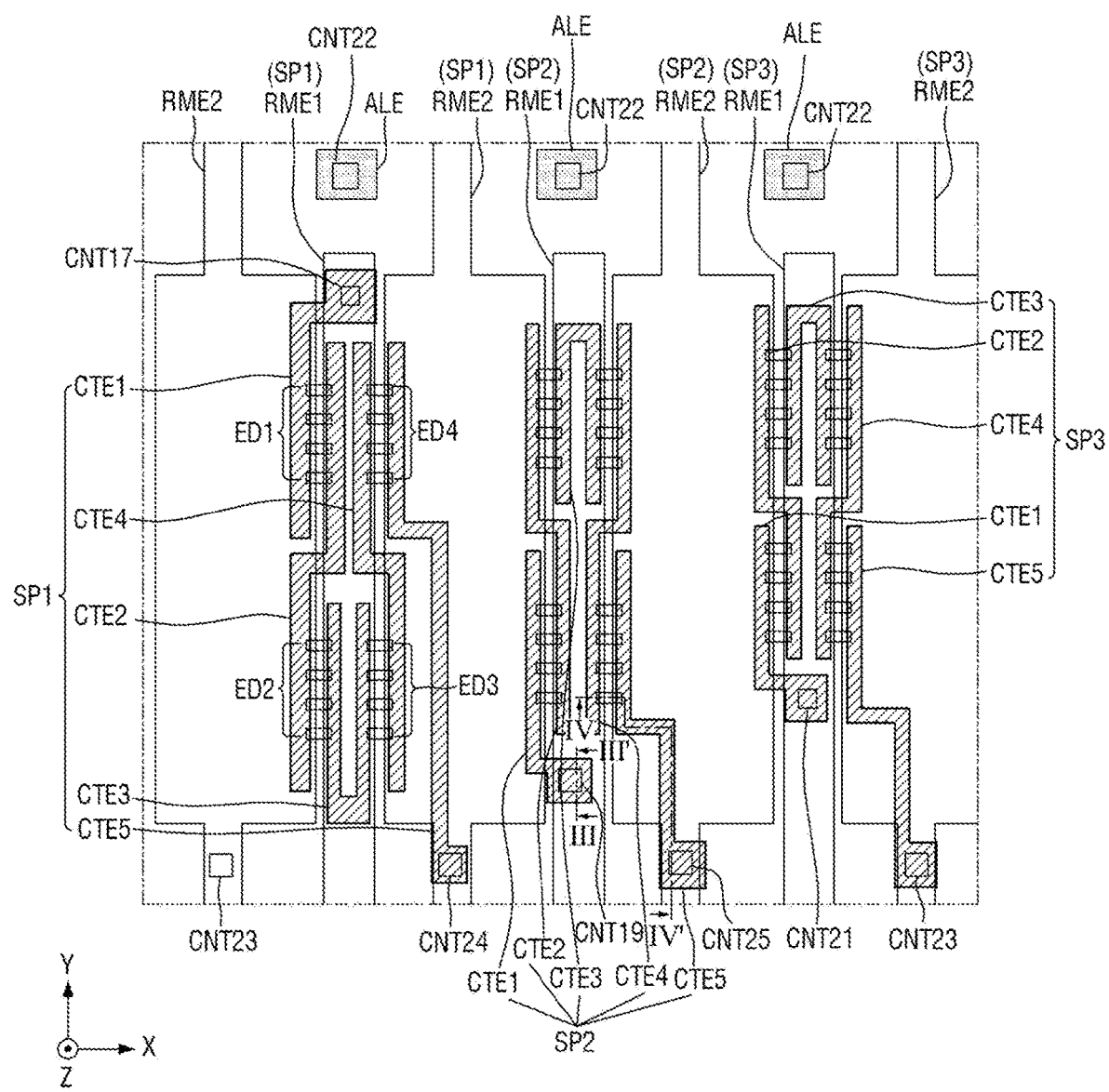
FIG. 16 is a plan view illustrating a layout of the third metal layer, light-emitting elements, and the fourth metal layer in the display device of FIG. 1.
Figure 17:
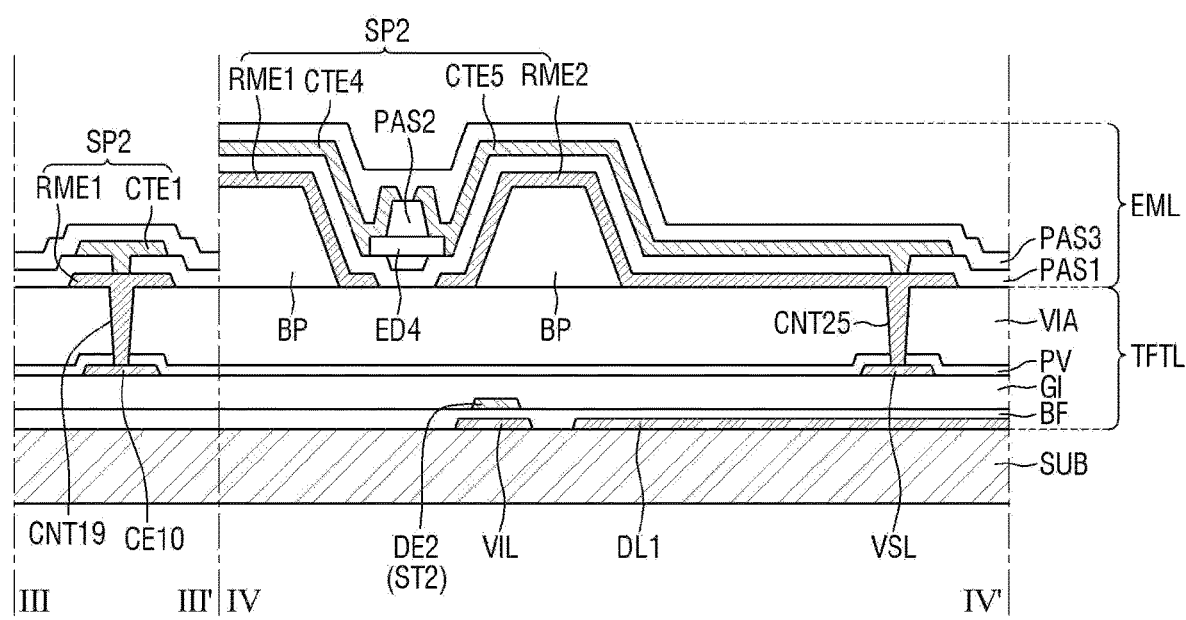
FIG. 17 is a schematic cross-sectional view taken along lines and IV-IV' of FIGS. 15 and 16.

FIG. 14 is a plan view illustrating a layout of a first metal layer, an active layer, a second metal layer, and a third metal layer of the display device of FIG. 1, and FIG. 15 is a plan view illustrating a layout of the first metal layer, the active layer, the second metal layer, the third metal layer, and a fourth metal layer of the display device of FIG. 1. FIG. 14 include the third metal layer in addition to FIGS. 5 and 6, and FIG. 15 includes the fourth metal layer in addition to FIG. 14. FIG. 16 is a plan view illustrating a layout of the third metal layer, light-emitting elements, and the fourth metal layer in the display device of FIG. 1, and FIG. 17 is a schematic cross-sectional view taken along lines and IV-IV' of FIGS. 15 and 16.

Referring to FIGS. 14 through 17, a light-emitting element layer EML may be disposed on a thin-film transistor (TFT) layer TFTL. The light-emitting element layer EML may include bank patterns BP, first electrodes RME1, second electrodes RME2, first light-emitting elements ED1, second light-emitting elements ED2, third light-emitting elements ED3, fourth light-emitting elements ED4, a first insulating film PAS1, a second insulating film PAS2, first contact electrodes CTE1, second contact electrodes CTE2, third contact electrodes CTE3, fourth contact electrodes CTE4, fifth contact electrodes CTE5, and a third insulating film PAS3.

The bank pattern BP may protrude from the via layer in an upward direction (or the Z-axis direction). Each of the bank patterns BP may have inclined sides. The first light-emitting elements ED1, the second light-emitting elements ED2, the third light-emitting elements ED3, and the fourth light-emitting elements ED4 may be disposed between the bank patterns BP. Multiple bank patterns BP may be disposed in the entire display area DA as island patterns.

First and second electrodes RME1 and RME2 of each of first, second, and third pixels SP1, SP2, and SP3 may be disposed in a third metal layer MTL3. The third metal layer MTL3 may be disposed on the via layer VIA and the bank patterns BP. The first and second electrodes RME1 and RME2 of each of the first, second, and third pixels SP1, SP2, and SP3 may extend in the second direction (or the Y-axis direction). The first electrode RME1 of the first pixel SP1 may be disposed between the second electrode RME2 of the first pixel SP1 and the second electrode RME2 of the second pixel SP2. The first electrode RME1 of the second pixel SP2 may be disposed between the second electrode RME2 of the second pixel SP2 and the second pixel RME2 of the third pixel SP3. The first electrode RME1 of the third pixel SP3 may be disposed between the second electrode RME2 of the third pixel SP2 and a second electrode RME2 of another first pixel SP1.

The first electrodes RME1 and the second electrodes RME2 may cover the top surface and the inclined sides of each of the bank patterns BP. Accordingly, the first electrodes RME1 and the second electrodes RME2 may reflect light emitted by the first light-emitting elements ED1, the second light-emitting elements ED2, the third light-emitting elements ED3, and the fourth light-emitting elements ED4, to an upward direction (or the Z-axis direction).

The first electrodes RME1 may be separated in units of rows. The first electrodes RME1 and the second electrodes RME2 may be alignment electrodes for aligning the first light-emitting elements ED1, the second light-emitting elements ED2, the third light-emitting elements ED3, and the fourth light-emitting elements ED4 during the fabrication of the display device 10. The first electrodes RME1 may initially be integrally formed with alignment electrodes ALE before separated from the alignment electrodes ALE, and the alignment electrodes ALE may be connected to a horizontal voltage line HVDL of the second metal layer MTL2 through twenty-second contact holes CNT22. The alignment electrodes ALE may receive a driving voltage or a high-potential voltage from the horizontal voltage line HVDL and may provide the driving voltage or the high-potential voltage to the first electrodes RME1. The first electrodes RME1 may be separated from the alignment electrodes ALE after the alignment of the light-emitting elements ED.

The first electrode RME1 of the first pixel SP1 may be connected to a fifth connection electrode CE5 of the second metal layer MTL2 through a seventeenth contact hole CNT17. The first electrode RME1 of the first pixel SP1 may receive a driving current through a first transistor ST1. The first electrode RME1 of the first pixel SP1 may provide the driving current to the first light-emitting elements ED1 of the first pixel SP1 through a first contact electrode CTE1.

The second electrode RME2 of the first pixel SP1 may be connected to a second voltage line VSL of the second metal layer MTL2 through a twenty-fourth contact hole CNT24. Accordingly, the second electrode RME2 of the first pixel SP1 may receive a low-potential voltage from the second voltage line VSL.

The first electrode RME1 of the second pixel SP2 may be connected to a tenth connection electrode CE10 of the second metal layer MTL2 through a nineteenth contact hole CNT19. The first electrode RME1 of the second pixel SP2 may receive a driving current through a first transistor ST1. The first electrode RME1 of the second pixel SP2 may provide the driving current to the first light-emitting elements ED1 of the second pixel SP2 through a first contact electrode CTE1.

The second electrode RME2 of the second pixel SP2 may be connected to a second voltage line VSL of the second metal layer MTL2 through a twenty-fifth contact hole CNT25. Accordingly, the second electrode RME2 of the second pixel SP2 may receive a low-potential voltage from the second voltage line VSL. The second electrode RME2 of the second pixel SP2 may overlap the pixel circuits of the first, second, and third pixels SP1, SP2, and SP3. As the second electrode RME2 of the second pixel SP2 covers first capacitor electrodes CPE1 of the first, second, and third pixels SP1, SP2, and SP3, any variations that may be caused by coupling capacitors of the first capacitor electrodes CPE1 can be minimized, and horizontal crosstalk can be prevented.

The first electrode RME1 of the third pixel SP3 may be connected to a fourteenth connection electrode CE14 of the second metal layer MTL2 through a twenty-first contact hole CNT21. The first electrode RME1 of the third pixel SP3 may receive a driving current through a first transistor ST1. The first electrode RME1 of the third pixel SP3 may provide the driving current to the first light-emitting elements ED1 of the third pixel SP3 through a first contact electrode CTE1.

The second electrode RME2 of the third pixel SP3 may be connected to a second voltage line VSL of the second metal layer MTL2 through a twenty-third contact hole CNT23. Accordingly, the second electrode RME2 of the third pixel SP3 may receive a low-potential voltage from the second voltage line VSL.

The first light-emitting elements ED1, the second light-emitting elements ED2, the third light-emitting elements ED3, and the fourth light-emitting elements ED4 may be aligned between the first electrodes RME1 and the second electrodes RME2. The first insulating film PAS1 may cover the first electrodes RME1 and the second electrodes RME2. The first light-emitting elements ED1, the second light-emitting elements ED2, the third light-emitting elements ED3, and the fourth light-emitting elements ED4 may be insulated from the first electrodes RME1 and the second electrodes RME2 by the first insulating film PAS1. Before the first electrodes RME1 are separated from the alignment electrodes ALE, the first electrodes RME1 and the second electrodes RME2 may receive alignment signals, and electric fields may be formed between the first electrodes RME1 and the second electrodes RME2. For example, the first light-emitting elements ED1, the second light-emitting elements ED2, the third light-emitting elements ED3, and the fourth light-emitting elements ED4 may be sprayed onto the first electrodes RME1 and the second electrodes RME2 by inkjet printing and may be aligned by dielectrophoretic forces from the electric fields between the first electrodes RME1 and the second electrodes RME2. Accordingly, the first light-emitting elements ED1, the second light-emitting elements ED2, the third light-emitting elements ED3, and the fourth light-emitting elements ED4 may be aligned between the first electrodes RME1 and the second electrodes RME2 along the second direction (or the Y-axis direction).

First, second, third, fourth, and fifth contact electrodes CTE1, CTE2, CTE3, CTE4, and CTE5 of each of the first, second, and third pixels SP1, SP2, and SP3 may be disposed in a fourth metal layer MTL4. The second insulating film PAS2 may be disposed on the middle parts of the light-emitting elements ED. The third insulating film PAS3 may cover the first and second insulating films PAS1 and PAS2 and the first, second, third, fourth, and fifth contact electrodes CTE1, CTE2, CTE3, CTE4, and CTE5 of each of the first, second, and third pixels SP1, SP2, and SP3. The second and third insulating films PAS2 and PAS3 may insulate the first, second, third, fourth, and fifth contact electrodes CTE1, CTE2, CTE3, CTE4, and CTE5 of each of the first, second, and third pixels SP1, SP2, and SP3 from one another.

The first contact electrode CTE1 of the first pixel SP1 may be disposed on the second electrode RME2 of the first pixel SP1 and may be connected to the first electrode RME1 of the first pixel SP1 through a contact hole overlapping the seventeenth contact hole CNT17. The first contact electrode CTE1 of the first pixel SP1 may be connected between the first electrode RME1 and first ends of the first light-emitting elements ED1 of the first pixel SP1. The first contact electrode CTE1 of the first pixel SP1 may correspond to the anodes of the first light-emitting elements ED1 of the first pixel SP1, but the disclosure is not limited thereto.

The second contact electrode CTE2 of the first pixel SP1 may be insulated from the first and second electrodes RME1 and RME2 of the first pixel SP1. A first part of the second contact electrode CTE2 of the first pixel SP1 may be disposed on the first electrode RME1 of the first pixel SP1 and may extend in the second direction (or the Y-axis direction). A second part of the second contact electrode CTE2 of the first pixel SP1 may be disposed on the second electrode RME2 of the third pixel SP3 and may extend in the second direction (or the Y-axis direction). The second part of the second contact electrode CTE2 of the first pixel SP1 may extend from the lower side of the first part of the second contact electrode CTE2 of the first pixel SP1.

The second contact electrode CTE2 of the first pixel SP1 may be connected between second ends of the first light-emitting elements ED1 of the first pixel SP1 and first ends of the second light-emitting elements ED2 of the first pixel SP1. The second contact electrode CTE2 of the first pixel SP1 may correspond to the third node N3 of FIG. 4. The second contact electrode CTE2 of the first pixel SP1 may correspond to the cathodes of the first light-emitting elements ED1 of the first pixel SP1, but the disclosure is not limited thereto. In an embodiment, the second contact electrode CTE2 of the first pixel SP1 may correspond to the anodes of the second light-emitting elements ED2 of the first pixel SP1, but the disclosure is not limited thereto.

The third contact electrode CTE3 of the first pixel SP1 may be insulated from the first and second electrodes RME1 and RME2 of the first pixel SP1. A first part of the third contact electrode CTE3 of the first pixel SP1 may be disposed on the first electrode RME1 of the first pixel SP1 and may extend in the second direction (or the Y-axis direction). A second part of the third contact electrode CTE3 of the first pixel SP1 may be disposed on the first electrode RME1 of the first pixel SP1, on the right side of the first part of the third contact electrode CTE3 of the first pixel SP1.

The third contact electrode CTE3 of the first pixel SP1 may be connected between second ends of the second light-emitting elements ED2 of the first pixel SP1 and first ends of the third light-emitting elements ED3 of the first pixel SP1. The third contact electrode CTE3 of the first pixel SP1 may correspond to the fourth node N4 of FIG. 4. The third contact electrode CTE3 of the first pixel SP1 may correspond to the cathodes of the second light-emitting elements ED2 of the first pixel SP1, but the disclosure is not limited thereto. In an embodiment, the third contact electrode CTE3 of the first pixel SP1 may correspond to the anodes of the third light-emitting elements ED3 of the first pixel SP1, but the disclosure is not limited thereto.

The fourth contact electrode CTE4 of the first pixel SP1 may be insulated from the first and second electrodes RME1 and RME2 of the first pixel SP1. A first part of the fourth contact electrode CTE4 of the first pixel SP1 may be disposed on the second electrode RME2 of the first pixel SP1 and may extend in the second direction (or the Y-axis direction). A second part of the fourth contact electrode CTE4 of the first pixel SP1 may be disposed on the first electrode RME1 of the first pixel SP1 and may extend in the second direction (or the Y-axis direction). The second part of the fourth contact electrode CTE4 of the first pixel SP1 may extend from the upper side of the first part of the fourth contact electrode CTE4 of the first pixel SP1.

The fourth contact electrode CTE4 of the first pixel SP1 may be connected between second ends of the third light-emitting elements ED3 of the first pixel SP1 and first ends of the fourth light-emitting elements ED4 of the first pixel SP1. The fourth contact electrode CTE4 of the first pixel SP1 may correspond to the fifth node N5 of FIG. 4. The fourth contact electrode CTE4 of the first pixel SP1 may correspond to the cathodes of the third light-emitting elements ED3 of the first pixel SP1, but the disclosure is not limited thereto. In an embodiment, the fourth contact electrode CTE4 of the first pixel SP1 may correspond to the anodes of the fourth light-emitting elements ED4 of the first pixel SP1, but the disclosure is not limited thereto.

The fifth contact electrode CTE5 of the first pixel SP1 may be insulated from the first and second electrodes RME1 and RME2 of the first pixel SP1. A first part of the fifth contact electrode CTE5 of the first pixel SP1 may be disposed on the second electrode RME2 of the first pixel SP1 and may extend in the second direction (or the Y-axis direction). A second part of the fifth contact electrode CTE5 of the first pixel SP1 may extend from the first part of the fifth contact electrode CTE5 of the first pixel SP1 over to the twenty-fourth contact hole CNT24. The second part of the fifth contact electrode CTE5 of the first pixel SP1 may extend from the lower side of the first part of the fifth contact electrode CTE5 of the first pixel SP1.

The fifth contact electrode CTE5 of the first pixel SP1 may be connected between second ends of the fourth light-emitting elements ED4 of the first pixel SP1 and the second electrode RME2 of the first pixel SP1. The fifth contact electrode CTE5 of the first pixel SP1 may correspond to the cathodes of the fourth light-emitting elements ED4 of the first pixel SP1, but the disclosure is not limited thereto. The fifth contact electrode CTE5 of the first pixel SP1 may receive a low-potential voltage from the second electrode RME2 of the first pixel SP1.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:
    a first voltage line disposed in a first metal layer on a substrate and extending in a first direction;
    a first transistor including a source electrode disposed in an active layer on the first metal layer and a gate electrode disposed in a second metal layer on the active layer, the first transistor being electrically connected to the first voltage line;
    a first connection electrode disposed in the second metal layer and integrally formed with the gate electrode of the first transistor;
    a cover pattern disposed in the second metal layer and spaced apart from the first connection electrode in the first direction; and
    a first capacitor including a first capacitor electrode disposed in the active layer and electrically connected to the gate electrode of the first transistor, and a second capacitor electrode disposed in the first metal layer and electrically connected to the source electrode of the first transistor,
    wherein a first side of the cover pattern and a first side of the first connection electrode facing each other overlap the first capacitor electrode in a plan view.

2. The display device of claim 1, wherein
    a first width of the cover pattern and a second width of the first connection electrode in a second direction are equal, and
    the second direction intersects the first direction.

3. The display device of claim 1, wherein a second side of the cover pattern adjacent to the first side of the cover pattern and a second side the first connection electrode adjacent to the first side of the first connection electrode are colinear with each other.

4. The display device of claim 1, further comprising:
    a data line disposed in the first metal layer and extending in the first direction; and
    a second transistor including a source electrode and a drain electrode and electrically connecting the data line and the first capacitor electrode.

5. The display device of claim 4, wherein the source electrode of the second transistor and the first capacitor electrode are integral with each other.

6. The display device of claim 4, further comprising:
    a second connection electrode disposed in the second metal layer and electrically connecting the data line and the drain electrode of the second transistor.

7. The display device of claim 1, further comprising:
    an initialization voltage line disposed in the first metal layer and extending in the first direction; and a third transistor including a source electrode and a drain electrode and electrically connecting the initialization voltage line and the source electrode of the first transistor.

8. The display device of claim 7, further comprising:
a third connection electrode disposed in the second metal layer and electrically connecting the initialization voltage line and the source electrode of the third transistor.

9. The display device of claim 7, further comprising:
a fourth connection electrode disposed in the second metal layer and electrically connecting the source electrode of the first transistor, the drain electrode of the third transistor, and the second capacitor electrode.

10. The display device of claim 1, further comprising:
a fifth connection electrode disposed in the second metal layer, electrically connected to the second capacitor electrode, and integrally formed with the cover pattern.

11. The display device of claim 10, further comprising:
a first electrode disposed in a third metal layer on the second metal layer, extending in the first direction, and electrically connected to the fifth connection electrode; and
a second electrode disposed in the third metal layer and extending in parallel to the first electrode.

12. The display device of claim 11, further comprising:
light-emitting elements arranged between the first electrode and the second electrode;
a second voltage line disposed in the second metal layer and extending in a second direction intersecting the first direction;
a first contact electrode disposed in a fourth metal layer on the third metal layer and electrically connecting the first electrode and the light-emitting elements; and
a second contact electrode disposed in the fourth metal layer and electrically connecting the second voltage line and the light-emitting elements.

13. The display device of claim 1, wherein the cover pattern is electrically floated.

14. The display device of claim 1, further comprising:
a vertical gate line disposed in the first metal layer and extending in the first direction;
a horizontal gate line disposed in the second metal layer and extending in a second direction intersecting the first direction; and
an auxiliary gate line extending in the first direction from the horizontal gate line.

15. A display device comprising:
a first metal layer disposed on a substrate;
an active layer disposed on the first metal layer;
a second metal layer disposed on the active layer;
a first transistor including a source electrode disposed in the active layer and a gate electrode disposed in the second metal layer;
a first connection electrode disposed in the second metal layer and integrally formed with the gate electrode of the first transistor;
a cover pattern disposed in the second metal layer and spaced apart from the first connection electrode in a first direction; and
a first capacitor including a first capacitor electrode disposed in the active layer and electrically connected to the gate electrode of the first transistor, and a second capacitor electrode disposed in the first metal layer and electrically connected to the source electrode of the first transistor, wherein
a first width of the cover pattern and a second width of the first connection electrode in a second direction are equal, and
the second direction intersects the first direction.

16. The display device of claim 15, wherein a first side of the cover pattern and a first side of the first connection electrode facing each other overlap the first capacitor electrode in a plan view.

17. The display device of claim 16, wherein a second side of the cover pattern adjacent to the first side of the cover pattern and a second side of the first connection electrode adjacent to the first side of the first connection electrode are colinear with each other.

18. The display device of claim 15, further comprising:
a data line disposed in the first metal layer and extending in the first direction; and
a second transistor electrically connecting the data line and the first capacitor electrode.

19. The display device of claim 15, further comprising:
an initialization voltage line disposed in the first metal layer and extending in the first direction; and
a third transistor electrically connecting the initialization voltage line and the source electrode of the first transistor.

20. The display device of claim 15, further comprising:
a first electrode disposed in a third metal layer on the second metal layer and extending in the first direction;
a second electrode disposed in the third metal layer and extending in parallel to the first electrode; and
a plurality of light-emitting elements arranged in the first direction between the first electrode and the second electrode.

* * * * *